US012630172B2

(12) United States Patent
Nakashima et al.

(10) Patent No.: US 12,630,172 B2
(45) Date of Patent: May 19, 2026

(54) INCENTIVE PROVIDING SYSTEM, INCENTIVE PROVIDING METHOD, AND PROGRAM

(71) Applicant: TOYOTA JIDOSHA KABUSHIKI KAISHA, Aichi-ken (JP)

(72) Inventors: Issei Nakashima, Tokyo-to (JP); Toru Miyagawa, Seto (JP); Hideo Hasegawa, Nagoya (JP); Yusuke Kinoshita, Tokyo-to (JP); Bing Xue, Tokyo-to (JP); Yuta Mori, Urayasu (JP); Takashi Homma, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 235 days.

(21) Appl. No.: 18/360,808

(22) Filed: Jul. 28, 2023

(65) Prior Publication Data

US 2024/0037594 A1     Feb. 1, 2024

(30) Foreign Application Priority Data

Aug. 1, 2022     (JP) ................................. 2022-122665

(51) Int. Cl.
*B60W 50/08*          (2020.01)

(52) U.S. Cl.
CPC ................................... *B60W 50/08* (2013.01)

(58) Field of Classification Search
CPC ................................................ G06Q 30/0231
See application file for complete search history.

(56) References Cited

U.S. PATENT DOCUMENTS

| | | | |
|---|---|---|---|
| 10,915,964 B1* | 2/2021 | Purgatorio | ............. G06Q 40/08 |
| 2010/0331607 A1 | 12/2010 | Pelgrim et al. | |
| 2011/0018701 A1* | 1/2011 | Mizuno | ............ G08G 1/096783 |
| | | | 340/438 |
| 2015/0084759 A1* | 3/2015 | Stefan | ...................... B60N 2/26 |
| | | | 340/438 |
| 2019/0008437 A1* | 1/2019 | Ben-Ezra | ............. G06V 10/803 |
| 2019/0043001 A1* | 2/2019 | Woulfe | .............. G01C 21/3438 |
| 2020/0005663 A1* | 1/2020 | Welles | ................... G09B 9/052 |

(Continued)

FOREIGN PATENT DOCUMENTS

| | | |
|---|---|---|
| EP | 3144862 A1 | 3/2017 |
| JP | 3530090 B2 | 5/2004 |

(Continued)

OTHER PUBLICATIONS

M. P S, S. K J, S. Vaishnavi and S. V G, "Automatic uplifting of pedestrian crossing platform using congestion monitoring," 2021 Second International Conference on Electronics and Sustainable Communication Systems (ICESC), Coimbatore, India, 2021, pp. 1532-1536. (Year: 2021).*

*Primary Examiner* — Jeff Zimmerman
*Assistant Examiner* — Hunter Molnar
(74) *Attorney, Agent, or Firm* — HAUPTMAN HAM, LLP

(57)          ABSTRACT

An incentive providing system capable of letting a user behave in such a way that his/her stress level is lowered and thus reducing his/her stress is provided. The incentive providing system according to the present disclosure executes: processing for acquiring a stress level indicating a degree of stress of a user; and providing an incentive for a user in a case in which the stress level of the user is lower than a predetermined standard.

15 Claims, 11 Drawing Sheets

(56) References Cited

U.S. PATENT DOCUMENTS

| | | | |
|---|---|---|---|
| 2021/0192944 A1* | 6/2021 | Sharma ................... | G08G 1/04 |
| 2021/0291840 A1* | 9/2021 | Murayama ............. | B60K 35/28 |
| 2021/0331709 A1* | 10/2021 | Kim .................... | A61B 5/1172 |
| 2025/0037873 A1* | 1/2025 | Kitade .................. | G16H 50/30 |

FOREIGN PATENT DOCUMENTS

| | | | | |
|---|---|---|---|---|
| JP | 5140087 | B2 | 2/2013 | |
| JP | 2017-059099 | A | 3/2017 | |
| JP | 2021-076916 | A | 5/2021 | |
| JP | 2021-165948 | A | 10/2021 | |
| WO | WO-2010067991 | A2 * | 6/2010 | ............ F21V 33/006 |
| WO | WO-2020153932 | A1 * | 7/2020 | ............. A61B 5/165 |

* cited by examiner

1

INCENTIVE PROVIDING SYSTEM

ACQUISITION UNIT — 1a

PROVISION
PROCESSING UNIT — 1b

12t

| FACILITY ID | TYPE OF FACILITY | CONDITION A | CONDITION B | CONDITION C | CONDITION D | CONDITION E | ... |
|---|---|---|---|---|---|---|---|
| 20a | TRAFFIC LIGHT | GREEN | RED | — | — | — | .. |
| 20c | CROSSWALK TRAFFIC LIGHT | GREEN | RED | — | — | — | .. |
| 20j | LIFTING TYPE STRIP | LOWERED | LIFTED | — | — | — | .. |
| 20v | LIFTING TYPE BRAILLE BLOCK | — | — | LIFTED | — | — | .. |
| 20p | DIGITAL SIGNAGE | FACILITY CONTROL CONTENT | NORMAL CONTENT | NORMAL CONTENT | NORMAL CONTENT | NORMAL CONTENT | .. |
| 20x | LIFTING TYPE GUARD RAIL | — | — | — | — | LIFTED | .. |
| 20w | VARIABLE SIGN | — | — | — | — | DISPLAY BICYCLE TRAVELING PROHIBITED | .. |
| 20d | TRAFFIC LIGHT | RED | GREEN | — | — | — | .. |
| .. | .. | .. | .. | .. | .. | .. | .. |

Fig. 7

| DATA No. | EXPLANATORY VARIABLES | | OBJECTIVE VARIABLE |
| | PULSE RATE INFORMATION | BODY TEMPERATURE INFORMATION | STRESS LEVEL |
|---|---|---|---|
| 1 | : | : | HIGH |
| 2 | : | : | NORMAL |
| 3 | : | : | LOW |
| ⋮ | ⋮ | ⋮ | ⋮ |

Fig. 10

INCENTIVE PROVIDING SYSTEM, INCENTIVE PROVIDING METHOD, AND PROGRAM

CROSS REFERENCE TO RELATED APPLICATIONS

This application is based upon and claims the benefit of priority from Japanese patent application No. 2022-122665, filed on Aug. 1, 2022, the disclosure of which is incorporated herein in its entirety by reference.

BACKGROUND

The present disclosure relates to an incentive providing system, an incentive providing method, and a program.

Japanese Unexamined Patent Application Publication No. 2021-076916 discloses a technique for calculating an evaluation score indicating a psychological state of a user based on acceleration data measured by a terminal apparatus used by the user, calculates an amount of change in the psychological state of the user by comparing an evaluation score in a predetermined period with an evaluation score outside the predetermined period, calculating a score that corresponds to a behavior that contributes to improving the psychological state of the user based on the amount of change in the psychological state of the user, and outputting the calculated score. Japanese Unexamined Patent Application Publication No. 2021-076916 further discloses a technique for outputting the aforementioned score given to the user, one or more kinds of products or services, and an exchange rate between them.

SUMMARY

However, in the technique disclosed in Japanese Unexamined Patent Application Publication No. 2021-076916, the user cannot acquire an incentive unless he/she takes any action that contributes to improving his/her psychological state. Therefore, it is possible that the user may not voluntarily take actions to reduce his/her stress.

The present disclosure has been made in view of the above problems, and provides an incentive providing system, an incentive providing method, and a program capable of letting a user behave in such a way that his/her stress level is lowered and thus reducing his/her stress.

An incentive providing system according to the present disclosure includes: an acquisition unit configured to acquire a stress level indicating a degree of stress of a user; and a provision processing unit configured to execute processing for providing an incentive for the user in a case in which the stress level of the user is lower than a predetermined standard. As a result, in the incentive providing system, processing for giving a preferential treatment to a user whose stress level is lower than a predetermined standard is performed, whereby it is possible to cause the user to voluntarily behave in such a way that his/her stress level is lowered, as a result of which the user's stress may be reduced.

The predetermined standard may be a standard in accordance with an attribute of the user. As a result, in the incentive providing system, a standard in accordance with an attribute of a user is set as a standard for providing an incentive, whereby it is possible to let the user behave in such a way that his/her stress level is lowered in accordance with the attribute of the user.

The provision processing unit may send, as the processing, to a traffic facility or a management system that manages the traffic facility, an instruction for controlling the traffic facility installed in at least one of a vicinity of a current position of the user for which the incentive is to be provided, a position on a route along which the user moves, or a position along the route, in such a way that the user for which the incentive is to be provided is able to preferentially move. As a result, in the incentive providing system, the traffic facility is controlled in such a way that user is able to preferentially move as an incentive to cause the user to move easily, whereby it becomes easy to let the user behave in such a way that his/her stress level is lowered.

Here, the traffic facility may change, regarding at least one of a change in display in the traffic facility or a change in the shape of the traffic facility, at least one of a timing when it is changed or a duration of a changed state based on the instruction. As a result, in the incentive providing system, at least one of the display in the traffic facility or the shape of the traffic facility is controlled in such a way that the user is able to preferentially move as an incentive to cause the user to move easily, whereby it becomes easy to let the user behave in such a way that his/her stress level is lowered.

The acquisition unit may acquire a stress level of the user who uses a mobile body, and the provision processing unit may send, as the processing, to a traffic facility or a management system that manages the traffic facility, an instruction for controlling the traffic facility installed in at least one of a vicinity of a current position of the mobile body used by the user for which the incentive is to be provided, a position on a route along which the mobile body moves, or a position along the route, in such a way that the mobile body is able to preferentially move. As a result, in the incentive providing system, the traffic facility is controlled in such a way that a mobile body used by a user is able to preferentially move as an incentive to cause the mobile body to move easily, whereby it becomes easy to let the user behave in such a way that his/her stress level is lowered.

Here, the traffic facility may change, regarding at least one of a change in display in the traffic facility or a change in the shape of the traffic facility, at least one of a timing when it is changed or a duration of a changed state based on the instruction. As a result, in the incentive providing system, at least one of the display in the traffic facility or the shape of the traffic facility is controlled in such a way that a mobile body used by a user is able to preferentially move as an incentive to cause the mobile body to move easily, whereby it becomes easy to let the user behave in such a way that his/her stress level is lowered.

The acquisition unit may acquire a stress level of the user who uses an autonomous mobile body that autonomously travels, and the provision processing unit may send, as the processing, to an autonomous mobile body or a movement management system that manages a movement of the autonomous mobile body, an instruction for controlling the autonomous mobile body used by the user for which the incentive is to be provided in such a way that this autonomous mobile body is able to preferentially move. As a result, in the incentive providing system, control is performed in such a way that an autonomous mobile body used by a user is able to preferentially move as an incentive to cause the autonomous mobile body to move easily, whereby it becomes easy to let the user behave in such a way that his/her stress level is lowered.

The provision processing unit may perform, as the processing, processing for providing at least one of electronic money, virtual currency, or points that can be used in a product purchasing service for the user for which the incentive is to be provided. As a result, in the incentive providing system, an incentive that may be easily used by a user can be provided, which causes the user to behave in such a way that his/her stress level is lowered more voluntarily.

The provision processing unit may send, as the processing, to a product management system that manages sending of a product, an instruction for sending the product to the user for which the incentive is to be provided. As a result, in the incentive providing system, an incentive that a user can easily use can be provided for the user, which causes the user to behave in such a way that his/her stress level is lowered more voluntarily.

The incentive providing system may include: an identification unit configured to identify the user; and an inquiry unit configured to send, to a terminal apparatus used by the user identified by the identification unit, an inquiry as to whether or not to perform processing for providing an incentive based on the stress level of the user. As a result, in the incentive providing system, it is possible to provide an incentive in accordance with the stress level by reflecting a user's desire.

The acquisition unit may acquire the stress level of the user measured by a measurement instrument worn by the user. As a result, in the incentive providing system, it is possible to let the user behave in such a way that his/her stress level is lowered in accordance with the measured stress level.

The acquisition unit may acquire vital information measured by a measurement instrument worn by the user and determine the stress level of the user based on the vital information. As a result, in the incentive providing system, it is possible to let the user behave in such a way that his/her stress level is lowered in accordance with the stress level determined based on the measured vital information.

The incentive providing system may include an identification unit configured to identify the user, in which the acquisition unit may acquire vital information measured by a measurement instrument worn by the user, and determine the stress level of the user from the vital information using a learning model trained by machine learning for the user identified by the identification unit. As a result, in the incentive providing system, it is possible to let the user behave in such a way that his/her stress level is lowered in accordance with the stress level accurately determined based on the measured vital information.

The acquisition unit may acquire imaging data obtained by imaging a face image of the user and determine the stress level of the user based on the imaging data. As a result, in the incentive providing system, it is possible to let the user behave in such a way that his/her stress level is lowered in accordance with the stress level determined based on the captured face image.

The incentive providing system may include an identification unit configured to identify the user, the acquisition unit may acquire imaging data obtained by imaging a face image of the user, and determine the stress level of the user from the imaging data using a learning model trained by machine learning for the user identified by the identification unit. As a result, in the incentive providing system, it is possible to let the user behave in such a way that his/her stress level is lowered in accordance with the stress level accurately determined based on the captured face image.

In an incentive providing method according to the present disclosure, a computer acquires a stress level indicating a degree of stress of a user, and the computer provides an incentive for the user in a case in which the stress level of the user is lower than a predetermined standard. As a result, in the incentive providing method, processing for giving a preferential treatment to a user whose stress level is lower than a predetermined standard is performed, whereby it is possible to cause the user to voluntarily behave in such a way that his/her stress level is lowered, as a result of which the user's stress may be reduced.

A program according to the present disclosure is a program for causing a computer to execute processing of: acquiring a stress level indicating a degree of stress of a user; and providing an incentive for the user in a case in which the stress level of the user is lower than a predetermined standard. As a result, the program performs processing for giving a preferential treatment to a user whose stress level is lower than a predetermined standard, whereby it is possible to cause the user to voluntarily behave in such a way that his/her stress level is lowered, as a result of which the user's stress may be reduced.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 7 is a diagram illustrating one example of a table used for controlling the traffic facilities in the system of FIG. 3;

FIG. 10 is a diagram illustrating an example of training data used in the learning system of FIG. 9.

DESCRIPTION OF EMBODIMENTS

Hereinafter, the present disclosure will be described with embodiments of the disclosure, but the disclosure according to the claims is not limited to the following embodiments. In addition, not all the configurations described in the embodiments are essential as means for solving the problem. Hereinafter, embodiments will be described with reference to the drawings.

Embodiment

Figure 1:
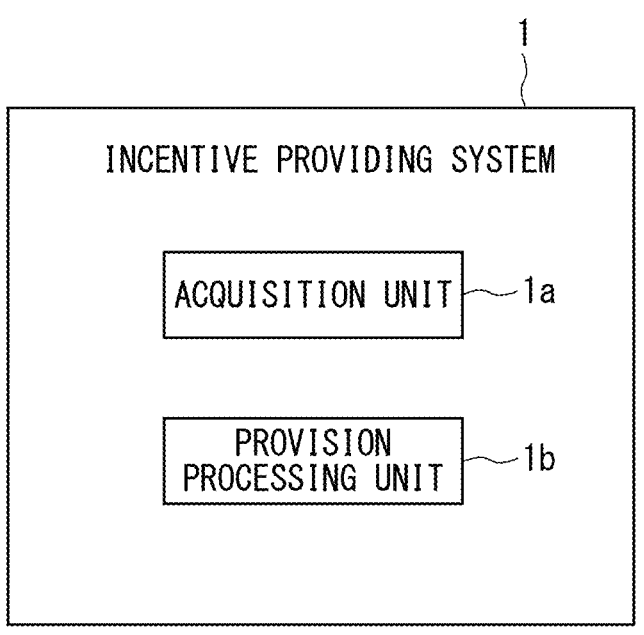
FIG. 1 is a block diagram illustrating a configuration example of an incentive providing system according to an embodiment.

FIG. 1 is a block diagram illustrating a configuration example of an incentive providing system (incentive granting system) according to this embodiment. As shown in FIG. 1, an incentive providing system 1 according to this embodiment may include an acquisition unit 1a and a provision processing unit 1b.

The acquisition unit 1a acquires a stress level indicating a degree of stress of a user. The stress level may be any index indicating the degree of stress and the acquisition unit 1a is able to acquire the stress level as one of a plurality of predetermined levels. The degree of stress may be, for example, a degree indicating whether the user is in an excessive stress state or a calm state. The excessive stress state may refer to a state in which a user is anxious or irritated.

The acquisition unit 1a may include, for example, an input interface for inputting information indicating the stress level stored in a storage unit (not shown) or information based on which the stress level is to be calculated, and an input control unit that controls input of information. Alternatively, the acquisition unit 1a may include an interface such as a communication interface that receives information indicating the stress level or information based on which the stress level is to be calculated from an external apparatus such as a server apparatus connected to an outside of the incentive providing system 1, and an input control unit that controls input of the information. In either configuration, the acquisition unit 1a may include a calculation unit (not shown) that calculates, when it inputs information based on which the stress level is calculated, the stress level from this information.

Alternatively, the acquisition unit 1a may also be configured to include a sensor for measuring a stress level or include a sensor that detects information based on which the stress level is to be calculated and a calculation unit (not shown) configured to calculate a stress level from the detected information. In these cases, the sensor may include a function of measuring one or a plurality of types of information that can express the stress level of the user.

Now, an example of the method for acquiring the stress level in the acquisition unit 1a will be described.

The acquisition unit 1a may acquire, for example, the stress level of the user measured by a measurement instrument worn by a user. This measurement instrument is able to measure the stress level by measuring, for example, vital information of a user who wears this measurement instrument and determining the stress level of the user by estimation or the like based on the result of the measurement. Alternatively, the acquisition unit 1a may acquire vital information measured by the measurement instrument worn by the user and determine the stress level of the user by estimation or the like based on the vital information.

Alternatively, the acquisition unit 1a may acquire imaging data obtained by imaging a face image of a user, and determine the stress level of the user by estimation or the like based on the imaging data. In the case in which the stress level is determined using the imaging data, the final determination may be made in consideration of the above-mentioned measured stress level or the stress level determined based on the measured vital information as well. It is therefore possible to accurately determine the stress level.

The above-mentioned imaging data will be supplementarily described. The imaging data may be a still image data or a series of still image data or moving image data captured at predetermined intervals, and may be acquired by an imaging apparatus (hereinafter referred to as a camera). Then, the acquisition unit 1a is able to extract data of a face region (face image data) from the imaging data obtained by the camera, detect or determine a facial expression of this user from the face image data, and determine the stress level of the user based on the facial expression that has been detected or determined.

Further, the acquisition unit 1a may be configured to include a camera or acquire imaging data from a camera. The camera may be mounted on a terminal apparatus such as a portable terminal apparatus used by a user. In this case, the imaging data may be acquired from the terminal apparatus.

Alternatively, cameras may be installed at substantially equal intervals in a management target region in a region where a user is assumed to move, or may be installed at substantially equal intervals on a road such as a sidewalk that may be assumed as a movement route of a user. However, the intervals at which the cameras are arranged is not limited to the equal intervals. For example, it is also possible to decrease the installation interval of the sensors at points where there is a change such as an intersection or a curve on a road. In addition, the cameras may be installed in at least places where a user is likely to pass, such as an entrance of the management target region and can also be installed continuously, for example, at regular intervals from the entrance. In addition, in a case where there is a bus (or an autonomous mobile body) that travels around a certain route in the management target region, the sensor may be installed at a bus stop. Here, the management target region may be, for example, a region in which a traffic facility is arranged, and may be, for example, a region designated on a town basis, a district basis, a prefecture basis, or the like, for example.

Instead of or in addition to the cameras, sensors other than the cameras that measure the stress level of the user, that is, a measurement instrument other than the cameras, may be installed in the management target region. A method for measuring the stress level in this case is not limited. For example, a microphone may be installed in the management target region, voice data indicating user's voice may be acquired by this microphone, the voice data may be analyzed, and the stress level of the user may be determined based on the result of the analysis or based on the result of the analysis and the face image data. In addition, sensors other than cameras may be mounted on a terminal apparatus such as a portable terminal apparatus used by a user.

As described above, a sensor that measures the stress level or information based on which the stress level is calculated may be a camera or other measurement instrument mounted on a terminal apparatus such as a portable terminal apparatus held by a user, a measurement instrument worn by the user, or a camera or a measurement instrument installed in each place in an environment where the user moves.

Since the sensor installed in the environment where the user moves performs sensing at each installation place, a sensing area at each installation place can also be referred to as a sensing zone. In addition, since a stress level of a user may also be used, for example, for health state management, the sensing zone may also be referred to as a healthcare zone. The healthcare zone is a zone in which data indicating a health state is acquired when a user only passes through the zone by walking or the like. The healthcare zone can include various sensors such as a camera necessary for acquiring information, a support such as a pole or a gate that supports the various sensors, and a communication unit that transmits results of measurement by the sensors. As described as the installation place of the sensor, the healthcare zone may be installed at least at a place where a user is likely to pass in the management target region, may be installed continuously, for example, at regular intervals from the place, or may be installed at a bus stop.

In addition, as can be seen from the fact that a user moves on a road such as a sidewalk, unless it is a one-way road or the like in a region where a user moves, the movement of the user is not limited to a movement in one direction, and includes a movement in two directions opposite to each other. Therefore, at least two sets of sensors installed in an environment where a user moves may be arranged so as to be able to cope with traffic of users in at least two directions, or a sensor that supports detection in multiple directions (or all directions) including at least the two directions may be adopted.

In a case in which the stress level of the user acquired by the acquisition unit 1a is lower than a predetermined standard, the provision processing unit 1b executes processing for providing an incentive for this user. The predetermined standard may be, for example, a predetermined value of indices of the stress level, that is, a predetermined level. In addition, the provision processing unit 1b may include a setting unit (not shown) for performing setting for changing the aforementioned predetermined standard. Note that an example of determining the stress level and an example of the incentive will be described later.

In a case in which the stress level of the user is lower than a predetermined standard, the provision processing unit 1b may perform processing for providing at least one of electronic money, virtual currency, or points that may be used in a product purchasing service for the user for which the incentive is to be provided. In this example, as processing for providing electronic money, virtual currency, or points, the provision processing unit 1b is able to instruct a management system that manages electronic money, virtual currency, or points to provide the incentive. Note that the kind of the electronic money, the kind of the virtual currency, the kind of the product purchasing service, the amount of electronic money to be provided, the amount of virtual currency to be provided, the value of the points to be provided and the like are not limited.

In addition, in a case in which the stress level of the user is lower than a predetermined standard, the provision processing unit 1b may send, to a product management system that manages sending of products, an instruction for sending a product to the user for which the incentive is to be provided. Here, although the kinds of the products are not limited, they may be, for example, health care goods, health foods or the like so that it is possible to further promote user's health.

Further, in a case in which the stress level of the user is lower than a predetermined standard, the provision processing unit 1b may send, to a traffic facility or a management system that manages the traffic facility, an instruction for controlling the traffic facility (traffic infrastructures) in such a way that the user for which the incentive is to be provided is able to preferentially move. Here, the traffic facility to be controlled is a traffic facility installed in at least one of the vicinity of the current position of the user for which the incentive is to be provided, a position on a route along which the user moves, or a position along the route.

The vicinity of the current position of the user may be, for example, the position of the sensor that acquires information indicating a stress level or information based on which the stress level is to be calculated or a detection range of the sensor.

Alternatively, in a case where the sensor can roughly detect a distance and direction from the sensor to the user, the vicinity of the current position of the user may be a region within a predetermined distance and a predetermined direction from the position of the user detected by the sensor. For example, the traffic facility installed in the vicinity of the current position of the user may be a traffic facility of which an azimuth angle is within a predetermined range from an orientation of the face of the user and which is installed within a predetermined distance from the user, or a traffic facility installed within a predetermined radius around the user.

Furthermore, the position on the route along which the user moves may be a range within a predetermined distance in a moving direction of the user from the current position of the user represented by the position of the sensor, an actual detection position of the user, or the like, and the moving direction may be a direction along a road in a case of a road such as a sidewalk, for example. As will be described below, the route may be a route indicated by a navigation system in a portable terminal apparatus (not shown) used by the user. In this case, the moving direction may be a traveling moving indicated by the route. In addition, the position along the route may be a position included in a range having a predetermined width in a direction perpendicular to the moving direction (a left-right direction of the user) at the position on the route.

In addition, the traffic facility to be controlled may change, regarding at least one of a change in display in the traffic facility or a change in the shape of the traffic facility, at least one of a timing when it is changed or a duration of a changed state based on the aforementioned instruction. That is, the provision processing unit 1b may send, to the traffic facility or the management system, as the aforementioned instruction, regarding at least one of a change in display in the traffic facility or a change in the shape of the traffic facility, an instruction for changing at least one of a timing when it is changed or a duration of a changed state. In a case in which the instruction is sent to the management system, this management system that has received this instruction controls the traffic facility for changing, regarding at least one of a change in display in the traffic facility or a change in the shape of the traffic facility, at least one of a timing when it is changed or a duration of a changed state.

The change in the display includes, for example, but not limited to, changing at least one of a timing when a traffic light turns green and a length of a green phase. In this example, the provision processing unit 1b sends, for example, an instruction for changing the timing when a traffic light turns green or sends an instruction for changing the length of the green phase so as to increase the length of the green phase of the traffic light based on a timing when a user having a low stress level passes.

The change in the shape includes, for example, but not limited to, changing a shape of the traffic facility so as to cause a separation line between a sidewalk and a roadway to physically appear. In this example, the provision processing unit 1b expands the sidewalk by sending an instruction for physically appearing the aforementioned separation line or changing the position where the aforementioned separation line appears in accordance with the timing when the user having a low stress level passes. Further, the change in the shape may indicate, for example, changing the shape of a traffic facility so as to retract a braille of a lifting type braille block that will be described later. In this example, the provision processing unit 1b sends an instruction for retracting the braille of the lifting type braille block that has appeared on the sidewalk in accordance with the timing when the user having a low stress level passes. Further, the change in the shape may also indicate the shape of a traffic facility so that a guardrail or a guard pole appears. In this example, the provision processing unit 1*b* sends an instruction for causing a guardrail or a guard pole to appear in accordance with the timing when the user having a low stress level passes.

Further, in a case in which a plurality of users are targets for which incentives regarding traffic facilities will be provided, it is required to determine, regarding one traffic facility or traffic facilities in one predetermined region, for which user an incentive is to be preferentially provided. For example, the provision processing unit 1*b* may send an instruction for performing control regarding one traffic facility or traffic facilities in one predetermined region in such a way that the priority of a user whose stress level is the lowest may be set the highest and the priorities of the other users may decrease with increasing the stress level. For example, the provision processing unit 1*b* may control the traffic facility in such a way that an instruction for changing a length of a green phase of the traffic light is sent in accordance with the user whose stress level is the lowest.

Further, the traffic facility to be controlled may be a traffic facility installed in at least one of the vicinity of the current position of a mobile body used by a user for which the incentive is to be provided, a position on a route along which the mobile body moves, or a position along the route. The mobile body here is not limited to a mobile body such as an automobile, a motorcycle, or a bicycle driven by a user, and may instead be a mobile body including an autonomous moving function, that is, an autonomous mobile body. However, in this case, it is assumed that the acquisition unit 1*a* acquires the stress level of the user who uses the mobile body.

In this case, in a case in which the stress level of the user is lower than a predetermined standard, the provision processing unit 1*b* sends, to a traffic facility or a management system that manages the traffic facility, an instruction for performing control in such a way that a mobile body is able to preferentially move in a traffic facility installed in at least one of the vicinity of the current position of a mobile body used by a user for which the incentive is to be provided, a position on a route along which the mobile body moves, or a position along the route. For example, the provision processing unit 1*b* may send, based on the timing when the mobile body that the user whose stress level is low is riding moves, an instruction for controlling the traffic light in such a way that the signal color turns green preferentially for the above mobile body to this traffic light or a management system that manages this traffic light.

Further, the target to be controlled may be an autonomous mobile body that autonomously travels or a movement management system that manages movement of the autonomous mobile body. This autonomous mobile body may indicate, for example, an autonomous bus that travels around a certain route in a management target region. In this case, however, the user whose stress level is to be acquired by the acquisition unit 1*a* is a user who uses the autonomous mobile body.

In the above case, in a case in which the stress level of the user is lower than a predetermined standard, the provision processing unit 1*b* sends, to the autonomous mobile body or the movement management system, an instruction for performing control so that the autonomous mobile body used by the user for which the incentive is to be provided can preferentially move. For example, the provision processing unit 1*b* may send, to the autonomous mobile body on which a user whose stress level is low is riding or the movement management system that manages the autonomous mobile body, an instruction for setting a comfortable route, such as a route where the number of curves is small, the number of intersections is small, or the movement time is short. Note that this comfortable route may be a route where a lane is designated.

In addition, in a case in which a plurality of users are persons for which an incentive regarding one autonomous mobile body is to be provided, it is necessary to decide for which user the incentive is to be preferentially provided. For example, the provision processing unit 1*b* may send an instruction for performing control regarding the same autonomous mobile body or the movement management system that manages the autonomous mobile body in such a way that the priority of the user whose stress level is the lowest is set the highest and the priorities of the other users decrease with increasing the stress level. For example, the provision processing unit 1*b* may send, to the autonomous mobile body or the movement management system that manages the autonomous mobile body, an instruction for setting a comfortable route for the user whose stress level is the lowest. Further, for example, for a plurality of users who use the same autonomous mobile body, only the user having the highest priority may be provided with an incentive. As a result, at least in the route along which the user having the highest priority moves, other users whose priorities are low are also able to perform comfortable movement. Further, in a route that does not overlap the route along which the user having the highest priority moves, a route regarding which users whose priorities are low would feel comfortable may be set.

Further, a plurality of kinds of autonomous mobile bodies may be controlled by one movement management system. In this case, even though users have the same stress level, the content of the instruction may vary for each kind of autonomous mobile bodies. This is because the target part that can be controlled, the range of the control value, a road or a lane where the autonomous mobile body can travel, the size of the autonomous mobile body, the number of people who can be in the autonomous mobile body, and the like may vary for each type of autonomous mobile bodies.

Further, the above-mentioned input control unit or the input control unit and the calculation unit, and the provision processing unit 1*b* may be included as a control unit that controls the entire incentive providing system 1. This control unit may be implemented by, for example, an integrated circuit and may be implemented by, for example, a processor such as a Central Processing Unit (CPU), a work memory, a nonvolatile storage apparatus, and the like. A control program executed by the processor is stored in the storage apparatus, and the processor reads the program to the work memory and executes the program, so that an input control function in the input control unit or this input control function and a function of calculation in the calculation unit, and a provision processing function in the provision processing unit 1*b* may be implemented. The aforementioned storage unit may use a part of the storage area of this storage apparatus.

Figure 2:
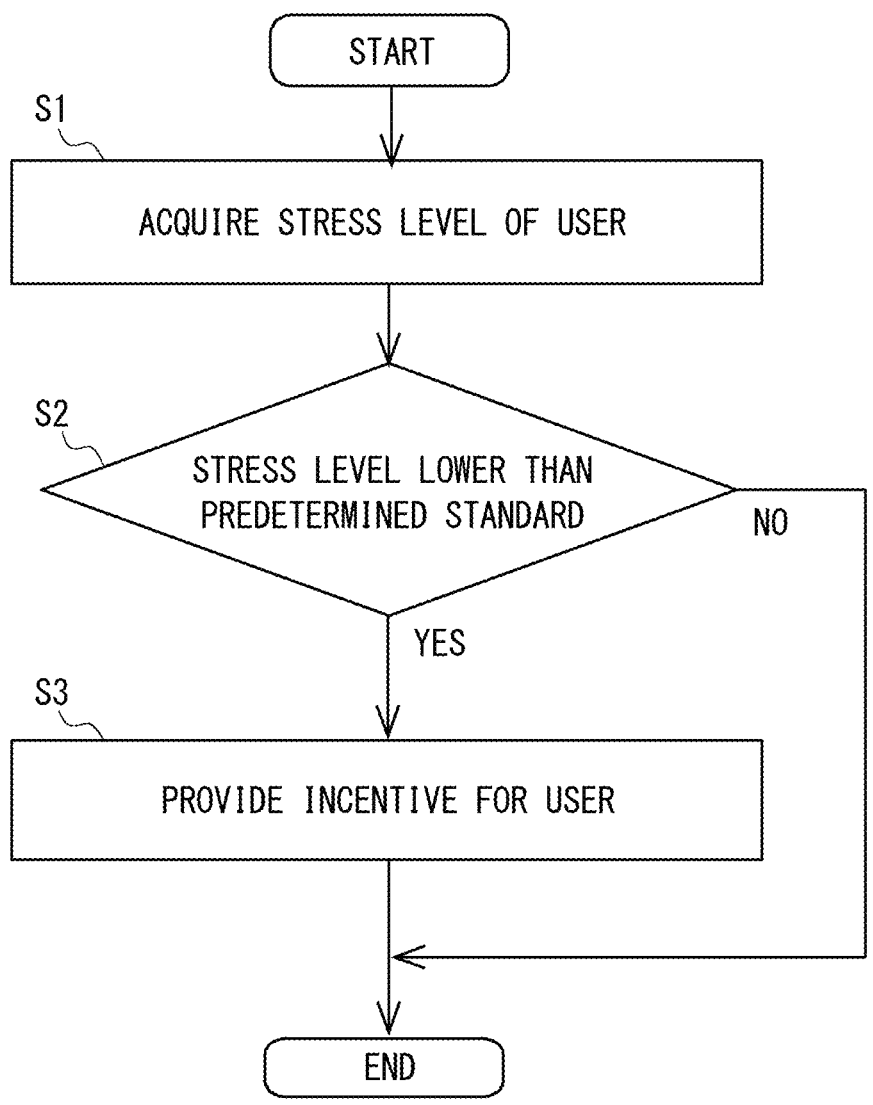
FIG. 2 is a flowchart for explaining an example of processing in the incentive providing system of FIG. 1.

Referring next to FIG. 2, one example of an incentive providing method executed in the incentive providing system 1 will be described. FIG. 2 is a flowchart for describing one example of processing in the incentive providing system 1.

In this incentive providing method, first, the acquisition unit 1*a* acquires the stress level of the user (Step S1) and the provision processing unit 1*b* determines whether or not the stress level is lower than a predetermined standard (Step S2). In a case in which it is determined to be YES in Step S2, that is, in a case in which the stress level is lower than the predetermined standard, the provision processing unit 1*b* provides an incentive for this user (Step S3) and ends the processing. On the other hand, in a case in which it is determined to be NO in Step S2, that is, in a case in which the stress level is equal to or higher than the predetermined standard, the provision processing unit 1*b* ends the processing without providing an incentive for this user.

Note that this incentive providing method may be executed mainly by a computer. The aforementioned control program may include a program for causing a computer to execute processing indicated by the incentive providing method.

As described above, the incentive providing system 1 performs processing for giving a preferential treatment to a user whose stress level is lower than a predetermined standard. Accordingly, the incentive providing system 1 may motivate a user to take actions to reduce his/her stress and cause the user to voluntarily behave in such a way that his/her stress level is lowered. With the incentive providing system 1, it is possible to reduce the user's stress and to preventively promote health of the user. In addition, with the incentive providing system 1, it is not necessary to provide, for example, a device for giving a sensory stimulation to the user in order to reduce the user's stress. In addition, even when the incentive providing system 1 is used by a user whose stress level is high, the user does not receive a lot of stress, which can prevent the stress level of a user whose stress level is high from further increasing.

Further, the incentive providing system 1 is able to let the user behave in such a way that his/her stress level is lowered in accordance with the feature of a method for acquiring the stress level that is adopted and the feature of an incentive to be adopted.

For example, the incentive providing system 1 acquires the stress level measured by a measurement instrument worn by the user, whereby it is possible to let the user behave in such a way that his/her stress level is lowered in accordance with the measured stress level. Further, the incentive providing system 1 measures vital information by a measurement instrument worn by the user, whereby it is possible to let the user behave in such a way that his/her stress level is lowered in accordance with the stress level determined based on the measured vital information. Further, the incentive providing system 1 acquires imaging data of the face image, whereby it is possible to let the user behave in such a way that his/her stress level is lowered in accordance with the stress level determined based on the captured face image.

Further, the incentive providing system 1 provides at least one of electronic money, virtual currency, or points, or a product as an incentive, whereby an incentive that may be easily used by a user is provided, which causes the user to behave in such a way that his/her stress level is lowered more voluntarily. Further, even when an incentive is provided for a user whose stress level is low, this provision does not have an influence on a user whose stress level is high, which can prevent the stress level of the user whose stress level is high from further increasing.

In addition, the incentive providing system 1 sends, to the traffic facility or the management system, an instruction for performing control in such a way that the user can preferentially move as an incentive, which causes the user to move easily, whereby it becomes easy to let the user behave in such a way that his/her stress level is lowered. Furthermore, the incentive providing system 1 sends, to the traffic facility or the management system, an instruction for controlling at least one of the display in the traffic facility or the shape of the traffic facility in such a way that the user can preferentially move as an incentive, which causes the user to move easily, whereby it becomes easy to let the user behave in such a way that his/her stress level is lowered.

Further, the incentive providing system 1 causes a mobile body used by a user to move easily by sending an instruction for controlling the traffic facility in such a way that the mobile body used by the user is able to preferentially move as an incentive, whereby it becomes easy to let the user behave in such a way that his/her stress level is lowered. In addition, the incentive providing system 1 causes the mobile body to move easily by sending an instruction for controlling at least one of the display in the traffic facility or the shape of the traffic facility in such a way that the mobile body used by the user is able to preferentially move as an incentive, whereby it becomes easy to let the user behave in such a way that his/her stress level is lowered. Further, the incentive providing system 1 causes an autonomous mobile body used by a user to move easily by sending, to the autonomous mobile body or the movement management system, an instruction for performing control in such a way that the autonomous mobile body used by the user is able to preferentially move as an incentive, whereby it becomes easy to let the user behave in such a way that his/her stress level is lowered.

Figure 3:
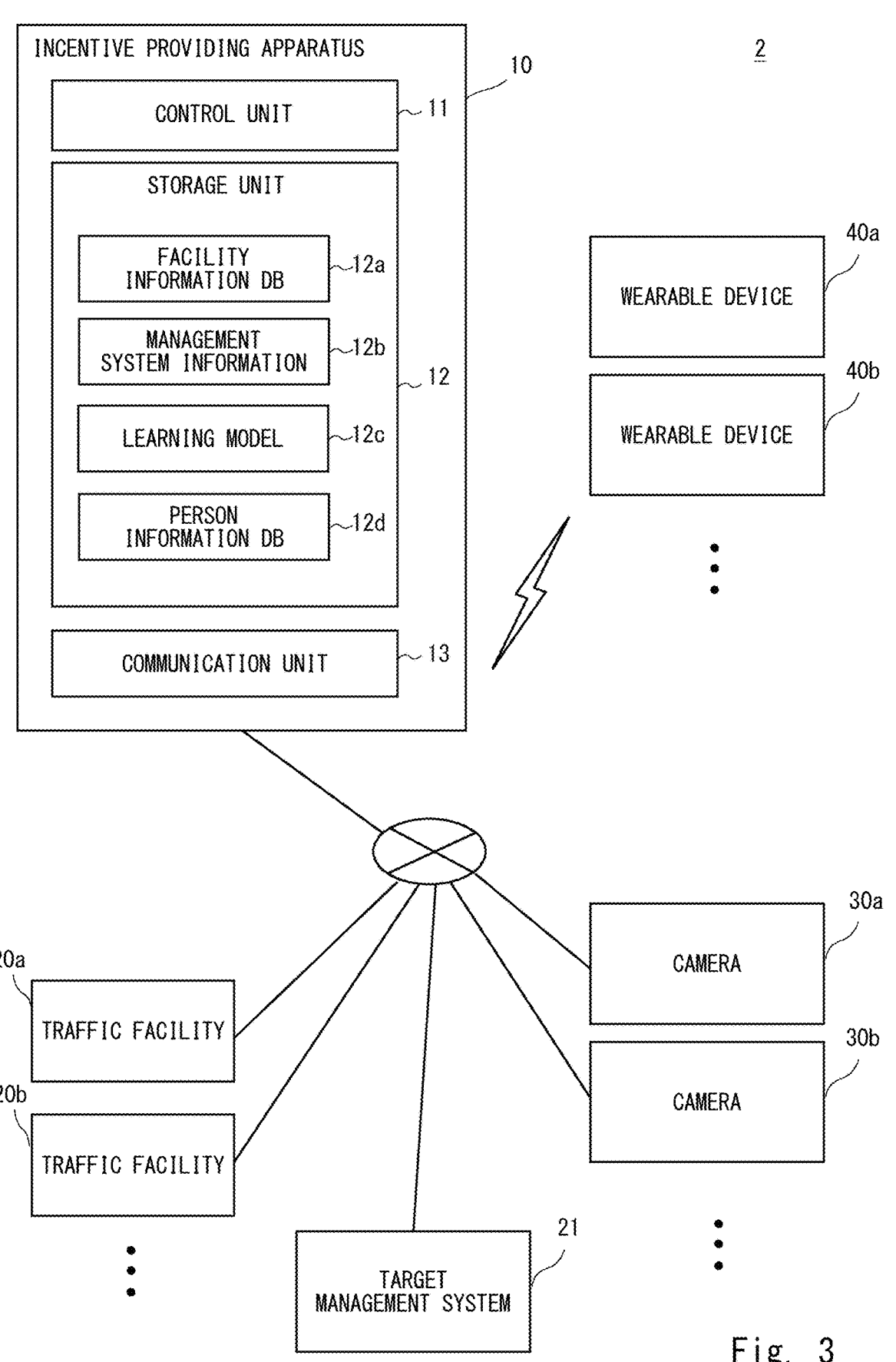
FIG. 3 is a block diagram illustrating a configuration example of a system including the incentive providing system of FIG. 1.

Next, a configuration example of the incentive providing system 1 will be described in detail. FIG. 3 is a block diagram illustrating a configuration example of a system including the incentive providing system 1.

A system 2 illustrated in FIG. 3 may include an incentive providing apparatus 10, which is an example of the incentive providing system 1, a plurality of traffic facilities 20*a*, 20*b*, and the like, and a target management system 21. Further, the system 2 may be configured, for example, to include any one of the traffic facilities 20*a*, 20*b*, and the like, or the target management system 21. While the traffic facilities 20*a*, 20*b*, and the like to be controlled will be described on the assumption that the incentive providing system 1 does not include the traffic facilities 20*a*, 20*b*, and the like, the traffic facilities 20*a*, 20*b*, and the like may be exemplary components of the incentive providing system 1. Further, while the target management system 21 will be described on the assumption that the incentive providing system 1 does not include the target management system 21, the target management system 21 may be an exemplary component of the incentive providing system 1.

The incentive providing apparatus 10 is an apparatus that controls the plurality of traffic facilities 20*a*, 20*b*, and the like, and the target management system 21, and may include, for example, a computer. It can be said that the incentive providing apparatus 10 includes a traffic facility control apparatus since it controls the plurality of traffic facilities 20*a*, 20*b*, and the like and includes a target management system control apparatus since it controls the target management system 21. The incentive providing apparatus 10 may be configured alone, but may also be configured as a distributed system in which functions thereof are distributed.

The plurality of traffic facilities 20*a*, 20*b*, and the like may be various types of traffic facilities such as a traffic light, a lifting type braille block, and the like. It is a matter of course that the number of traffic facilities to be controlled may be one and the number of target management systems to be controlled is not limited.

The target management system 21 may be a system for managing various targets to be provided as incentives, such as an electronic money management system that manages electronic money, a point management system that manages points, and a product management system that manages sending of products. It is a matter of course that the target management system 21 will be described as one target management system 21 for the sake of convenience, target management systems 21 may be constructed as separate systems for each target to be provided as an incentive.

Further, the system 2 may include a sensor group for obtaining information used for control in the incentive providing apparatus 10 as the exemplary components of the incentive providing system 1. As shown in FIG. 3, the sensor group may include, for example, a plurality of cameras 30a, 30b, and the like, and may further include wearable devices 40a, 40b, and the like worn by users. It is a matter of course that the camera 30a and the like, and the wearable device 40a and the like may not be included in the exemplary components of the incentive providing system 1.

In the following description, in a case where the traffic facilities 20a, 20b, and the like are not distinguished from one another, they are referred to as the traffic facility 20. Similarly, in a case where the cameras 30a, 30b, and the like and the wearable devices 40a, 40b, and the like are not individually distinguished, they are referred to as the camera 30 and the wearable device 40, respectively.

The incentive providing apparatus 10 may include a control unit 11 that controls the entire incentive providing apparatus 10, a storage unit 12 implemented by a storage apparatus, and a communication unit 13 implemented by a communication interface or the like that communicates with an external apparatus.

It is assumed that the control unit 11 has a function other than the interface for communication or input/output in the provision processing unit 1b along with a function other than the interface for communication or input/output in the acquisition unit 1a. The control unit 11 may be implemented by, for example, a processor, a work memory, a nonvolatile storage apparatus, and the like. A control program executed by the processor is stored in the storage apparatus, and the processor reads the program to the work memory and executes the program, so that the function of the control unit 11 may be implemented. The control program may include a program for implementing the acquisition function in the acquisition unit 1a and a program for implementing the incentive providing function in the provision processing unit 1b. In this case, the processor reads the program to the work memory and executes the program, thereby implementing the functions. Note that functions not included in the control program may be implemented by a hardware configuration.

The storage unit 12 may store a facility information DB 12a, which is a DB storing information regarding the traffic facility 20, management system information 12b, which is information regarding the target management system 21, a learning model 12c, and a person information DB 12d, which is a DB storing person information. The information regarding the traffic facility 20, the management system information 12b, the person information, coefficients of the learning model 12c, and the like stored in the storage unit 12 may be kept up to date as appropriate. In addition, although not shown, the storage unit 12 also stores position information indicating an installation position of a sensor such as the installed camera 30. Details of the facility information DB 12a, the management system information 12b, the learning model 12c, and the person information DB 12d will be described later.

In order to obtain information necessary for the control of the traffic facility 20 and the target management system 21 in the control unit 11, the communication unit 13 performs communication with the camera 30 via a wired network, performs communication with the wearable device 40 via a wireless network, and transfers the obtained information to the control unit 11. In addition, the communication unit 13 communicates with the traffic facility 20 via a wired network in order to obtain the current state (the current control state such as a current display color in a case of a traffic light, for example) of the traffic facility 20 as necessary and to transmit a control signal for controlling the traffic facility 20 to be controlled. Further, the communication unit 13 communicates with the target management system 21 via a wired network in order to obtain a current value to be provided regarding a user in the target management system 21 as necessary (a state of the balance of, for example, electronic money, virtual currency, or points) and to transmit a value to be provided and a control signal for causing the target management system 21 to execute the provision processing. However, regardless of a method for communication between the communication unit 13 and another apparatus, as long as wireless communication is performed with at least the wearable device 40, wireless communication with one or more of the traffic facility 20, the camera 30, and the target management system 21 may be performed.

The camera 30 is a camera used as a sensor that acquires imaging data to be acquired by the acquisition unit 1a to determine a stress level, images a user, including his/her face, acquires imaging data, and transmits the imaging data to the incentive providing apparatus 10. The camera 30 can include a communication interface built in or be connected to a communication interface for the transmission. The imaging data is received by the communication unit 13 of the incentive providing apparatus 10, transferred to the control unit 11, and is used to determine the stress level. This imaging data may also be used to identify a user. Like in this example, the incentive providing apparatus 10 may include an acquisition unit that acquires imaging data obtained by imaging a face image of the user. In FIG. 3, the communication unit 13 and the control unit 11 that controls the acquisition thereof are examples of the acquisition unit.

The wearable device 40 is an example of a measurement instrument (measurement apparatus) that measures vital information of a user in order to determine the stress level of the user by the incentive providing apparatus 10. The wearable device 40 may be a smart watch, a smart ring, an IC chip embedded in a human body, or the like, but is not limited thereto.

Furthermore, the vital information measured by the wearable device 40 may be, for example, information indicating one or more of a pulse rate or heart rate, a respiration (rate), a blood pressure, a body temperature, and the like. The vital information to be measured is not limited to above information and may include, for example, information indicating electrocardiogram. The vital information is information whose value changes even for the same person, for example, while the person is controlling his/her bladder, while the person is running, or while the person is walking normally.

The wearable device 40 directly or indirectly transmits the acquired vital information to the incentive providing apparatus 10. The wearable device 40 may include a communication interface built in or be connected to a communication interface for the transmission. The wearable device 40 may be configured to measure the stress level and transmit the measured stress level to the incentive providing apparatus 10.

In a simple example, the wearable device 40 may be configured to spontaneously transmit the vital information to the incentive providing apparatus 10, for example, at a predetermined interval or the like. The transmission may be direct or indirect. In this case, the incentive providing apparatus 10 can have a function of collecting and managing the vital information as a server apparatus (not shown) or the like. In this case, transmission of the vital information to the incentive providing apparatus 10 may be permitted in advance in the wearable device 40 or a portable terminal apparatus (not shown) connectable thereto. In such a spontaneous transmission example, it is not necessary to transmit a vital information transmission request in a state where the wearable device 40 is designated from the incentive providing apparatus 10. The vital information that is directly or indirectly transmitted from the wearable device 40 may include information indicating a user, and an identification unit that will be explained later may identify the user based on this information.

Regardless of whether the transmission is performed directly or indirectly or regardless of whether the vital information transmission request is required, the vital information is received by the communication unit 13 of the incentive providing apparatus 10 and transferred to the control unit 11. Like in this example, the incentive providing apparatus 10 may include an acquisition unit that acquires vital information of a user measured by the measurement instrument worn by the user. In FIG. 3, the communication unit 13 and the control unit 11 that controls the acquisition are examples of the acquisition unit.

An example in which the wearable device 40 indirectly transmits the vital information will be described. The wearable device 40 transmits the vital information to the portable terminal apparatus used by the person wearing the wearable device 40 by short-range wireless communication or the like, and the portable terminal apparatus transmits the vital information to the incentive providing apparatus 10. The portable terminal apparatus may be, for example, a portable phone such as a smartphone, a tablet terminal, a mobile personal computer (PC), or the like. A method for the short-range wireless communication described above and below is not limited, and various methods such as Wi-Fi (registered trademark), Bluetooth (registered trademark), Bluetooth Low Energy (registered trademark), and ZigBee (registered trademark) may be adopted.

In addition, the vital information may be transmitted via a communication interface with which short-range wireless communication with the wearable device 40 or the portable terminal apparatus may be performed, the communication interface being built in or connected to the camera 30.

Then, the wearable device 40 or the portable terminal apparatus may be configured to automatically transmit the vital information when entering an area in which wireless communication with the communication interface may be performed. In such a configuration, it is not necessary to transmit a vital information transmission request in a state where the wearable device 40 or the portable terminal apparatus is designated from the incentive providing apparatus 10. Also in this case, transmission of the vital information to the incentive providing apparatus 10 may be permitted in advance in the wearable device 40 or the portable terminal apparatus.

Alternatively, the wearable device 40 may be configured to return the vital information in a case where a vital information transmission request is received from the incentive providing apparatus 10 via the communication interface. However, in this case, it is necessary that the incentive providing apparatus 10 includes the identification unit that identifies a user, and designates the wearable device 40 or the portable terminal apparatus associated with the user (individual) identified by the identification unit to make the vital information transmission request. In this way, the incentive providing apparatus 10 can transmit the vital information transmission request to the wearable device 40 or the portable terminal apparatus used by the user identified by the identification unit and obtain the vital information as a response. Details of the identification unit will be described below together with the description of the person information DB 12*d*.

Alternatively, the wearable device 40 may regularly transmit vital information to an external server apparatus (not shown) of the system 2 and this server apparatus may always manage the latest vital information. In this case, the server apparatus may be configured to return the vital information in a case in which the server apparatus has received a vital information transmission request from the incentive providing apparatus 10. However, in this case as well, it is necessary that the incentive providing apparatus 10 includes the identification unit that identifies a user (individual) identified by the identification unit to send a vital information transmission request to the server apparatus.

Next, the information and the like stored in the storage unit 12 will be described in detail.

The facility information DB 12*a* may be a DB that stores, for each of the traffic facilities 20, facility identification information such as an ID and an instrument number for identifying the traffic facility 20, facility type information indicating a type of the traffic facility 20, and position information indicating an installation position of the traffic facility 20 in association with each other. The traffic facility 20 to be controlled may be one or more of various types of traffic facilities 20 described below with reference to FIGS. 4 to 6, for example, regardless of the type and number thereof. The facility type information may be included in the facility identification information or may be implicitly included.

In addition, it is sufficient if the position information is information that specifies a position, such as information indicating latitude and longitude or information indicating coordinates on map data. The position information may be referred to for comparison with the position of a user, or for comparison with the position of a sensor such as the camera 30 in a case where the position of the sensor is used as the position of a user. Furthermore, the position information can include information indicating a direction in which a user can view the traffic facility 20 in a case where the traffic facility 20 is a facility having a function of displaying information to be viewed by a user. Furthermore, the position information can include information indicating a direction suitable for a user to listen a sound in a case where the traffic facility 20 is a facility having a function of outputting a sound.

The management system information 12*b* may include a connection destination such as an Internet Protocol (IP) address or the like of the target management system 21, and a value to be provided when an incentive is provided. The management system information 12*b* may be changed by an administrator or the like. That is, the control unit 11 may also include a setting unit (not shown) for performing setting to change the management system information 12*b*.

The learning model 12*c* is a learning model that inputs at least one of the vital information of a user obtained from the wearable device 40 or imaging data obtained by imaging the user including his/her face by the camera 30 and outputs a determination result obtained by determining a stress level of the user, and an algorithm or the like thereof is not limited. In addition, the input parameters are not limited thereto.

The learning model 12c may be obtained, for example, as follows. That is, the learning model 12c may be obtained by inputting, to an untrained learning model, a data set including at least one of vital information or imaging data obtained by imaging a user including his/her face by the camera 30, and ground truth data regarding a degree of stress obtained at this time, for example, from the person himself/herself, to perform machine learning. The ground truth data may be information obtained from a third party such as a doctor instead of the response from the person himself/herself or in addition to the response from the person himself/herself. The learning model 12c may be a model that can accurately determine the stress level of the user from at least one of the vital information or the imaging data by learning the data set for a number of users to the extent that over-learning does not occur. Note that a system that perform such learning will be described later.

Then, by using the aforementioned learning model 12c, the control unit 11 may be configured to determine the stress level of the user based on at least one of the user's vital information measured by the wearable device 40 or imaging data obtained by imaging the user including his/her face by the camera 30 (that is, imaging data including the face image data). Alternatively, the control unit 11 may also be configured to determine, without using the learning model 12c, a stress level of a user based on at least one of the user's vital information measured by the wearable device 40 or imaging data obtained by imaging the user including his/her face by the camera 30. In a case in which the determination is made based on the imaging data, the control unit 11 may extract, for example, data of a face region (face image data) from the imaging data, detect or determine a facial expression of the user from the face image data, and determine the stress level of the user based on the facial expression that has been detected or determined.

As described above, since the incentive providing apparatus 10 is configured to determine a stress level of a user based on measured vital information, thereby accurately determining the stress level of the user. In addition, the incentive providing apparatus 10 is configured to determine the stress level of the user based on the face image data. Since a stress level of a user easily appears in a face image, it can be said that a stress level of a user may be accurately determined. In addition, a stress level of a user may be determined based on only one of imaging data in which a facial expression of the user appears or vital information measured by the wearable device 40, but a stress level may be determined (estimated) more accurately by combining the imaging data and the vital information.

Furthermore, the learning model 12c may be constructed as one learning model that receives, for example, at least one of vital information of a user and imaging data obtained by imaging the user, and outputs a traffic facility 20 and a target management system 21 to be controlled and a control content described later. Also in these cases, an algorithm or the like of the learning model is not limited.

The person information DB 12d will be described. The incentive providing apparatus 10 can include the identification unit as described above, and the person information DB 12d may be included as a part of the identification unit. The incentive providing apparatus 10 can include, as the identification unit, the person information DB 12d and a function of identifying a user with reference to the person information DB 12d, and the control unit 11 can have this function. The identification unit can identify a user by, for example, at least one of face authentication processing or gait authentication processing. The person information DB 12d is a DB referred to for identifying a user and does not need to be stored in a configuration in which identification of a user is unnecessary, that is, in a configuration in which the identification unit is not provided.

The person information DB 12d may be, for example, a DB that stores at least one of face image data or gait data and personal identification information such as a name or an ID for each user to be managed. The face image data may be adopted in a configuration in which the identification unit identifies a user by the face authentication processing, and the gait data may be adopted in a configuration in which the identification unit identifies a user by the gait authentication processing. It is a matter of course that the identification unit can execute both the face authentication processing and the gait authentication processing. For example, when authentication is successful in both the face authentication processing and the gait authentication processing, it may be determined that the user has been identified.

In addition, the personal identification information can include information such as an ID for identifying the wearable device 40 or information such as an ID for identifying a portable terminal apparatus connectable to the wearable device 40 instead of or in addition to the name or ID.

Then, for example, the identification unit can identify a user by comparing imaging data obtained by the camera 30 with at least one of face image data or gait data stored in the person information DB 12d, and output the corresponding individual identification information or the like. In a case where the face authentication processing is used to identify a user, the camera 30 may be installed in such a way as to meet conditions such as a position, an imaging direction, and an imaging magnification for imaging the face of the user, to perform imaging. In a case where the gait authentication processing is used to identify a user, the camera 30 does not need to be installed in such a way as to meet such conditions, and it is sufficient that the camera 30 is installed in such a way as to meet conditions such as a position, an imaging direction, and an imaging magnification for imaging a walking figure of the user (that is, imaging the entire user). However, the identification unit may use, as imaging data, imaging data acquired by a camera included in a terminal apparatus such as a portable terminal apparatus used by a user.

For example, the identification unit may detect a person from imaging data obtained by the camera 30 and execute the above-mentioned comparison processing in a case where the person has been detected. That is, the identification unit may execute the above-mentioned comparison processing when a person enters an imaging range of the camera 30.

Furthermore, the identification unit may be configured to identify a user by using a learning model. That is, instead of the person information DB 12d, a learning model that receives at least one of face image data or imaging data obtained by imaging an entire user and outputs information indicating the user, the wearable device 40, or the portable terminal apparatus may be stored in the storage unit 12. At the time of operation, the control unit 11 can input imaging data captured by the camera 30 to the learning model and obtain information indicating the user, the wearable device 40, or the portable terminal apparatus. In a learning stage, machine learning is executed by a portable terminal apparatus used by each individual, and a learning model as a result of the machine learning, a learned coefficient, or the like is transmitted to the incentive providing apparatus 10, whereby the incentive providing apparatus 10 can identify a user by using the learning model for each individual.

Here, a modified example of the learning model 12c will be described. The learning model 12c may be stored as a model trained by machine learning for each user. Then, the control unit 11 may determine a stress level of a user from at least one of vital information measured by the wearable device 40 for the user or imaging data obtained by imaging the user by using the learning model trained by machine learning for the user identified by the identification unit.

With the aforementioned configuration, the incentive providing apparatus 10 uses a learning model dedicated to the user, whereby it is possible to determine a stress level of a user more accurately. As a result, with the incentive providing apparatus 10, because of the function of the provision processing unit 1b, it is possible to let the user behave in such a way that his/her stress level is lowered in accordance with the stress level accurately determined (by a determination standard dedicated to the user) based on at least one of vital information that has been measured and the captured face image.

In addition, the learning model 12c may be constructed as a model dedicated to each piece of attribute information without being a model dedicated to each user. Here, examples of the attribute information may include at least one of an age group, an age, a gender, or a race. Then, the control unit 11 may determine a stress level of a user from at least one of vital information measured by the wearable device 40 for the user corresponding to the attribute information or imaging data obtained by imaging the user by using the learning model trained by machine learning for the attribute information. As described above, the incentive providing apparatus 10 may be configured to determine a stress level of a user by using the learning model trained by machine learning for the attribute information of the user. Since it is assumed that the vital information is heavily dependent on the attribute information and the facial expression included in the captured data is heavily dependent on the attribute information, it can be said that the incentive providing apparatus 10 having such a configuration can accurately determine a stress level of a user.

Next, the function of the provision processing unit 1b in the control unit 11 will be described.

The control unit 11 determines whether or not the stress level of the user is lower than a predetermined standard based on the stress level of the user obtained by any of the various examples described above, and executes processing for providing an incentive for a user when the stress level of the user is lower than a predetermined standard. As a result, with the incentive providing apparatus 10, it is possible to let the user behave in such a way that his/her stress level is lowered.

In addition, the above-mentioned attribute information may be used to set the aforementioned predetermined standard. That is, the above-mentioned predetermined standard may be a standard in accordance with an attribute of the user. As a result, in the incentive providing apparatus 10, an incentive is provided based on a standard in accordance with the attribute of the user, whereby it is possible to let the user behave in such a way that his/her stress level is lowered in accordance with the attribute of the user. In a case in which, for example, the user is an elderly person, the predetermined standard may be set higher and thus an incentive may be provided more easily than that in a case in which the user is a young person. Alternatively, in the case in which the user is an elderly person, the predetermined standard may be set lower and thus an incentive may be provided less easily than that in a case in which the user is a young person. The former idea means that elderly people are preferentially treated over young people, whereas the latter idea means that young people are preferentially treated over elderly people, considering that the stress tolerance of the young people is lower than that of the elderly people.

In a case, for example, in which the stress level of the user is lower than a predetermined standard, the control unit 11 performs processing for providing at least one of electronic money, virtual currency, or points that may be used in a product purchasing service for the user for which the incentive is to be provided. In this example, the control unit 11 may instruct, as processing for providing at least one of electronic money, virtual currency, or points, the target management system 21 to provide the incentive in accordance with the management system information 12b. As a result, the target management system 21 is able to provide at least one of electronic money, virtual currency, or points for the user and this user can receive this incentive.

Alternatively, in a case in which the stress level of the user is lower than a predetermined standard, the control unit 11 is able to send, to a product management system, which is an example of the target management system 21, an instruction for sending a product to the user for which the incentive is to be provided in accordance with the management system information 12b. As a result, the target management system 21 may arrange to send this product to the user, and the user is able to receive this product.

Alternatively, the control unit 11 is able to perform control for providing, as an incentive, an incentive regarding the traffic facility 20. For example, in a case in which the stress level of the user is lower than a predetermined standard, the control unit 11 controls the traffic facility 20 installed in at least one of the vicinity of the current position of the user, a position on a route along which the user moves, or a position along the route. The definitions of the current position, the route, and the like are as described above.

Figure 4:
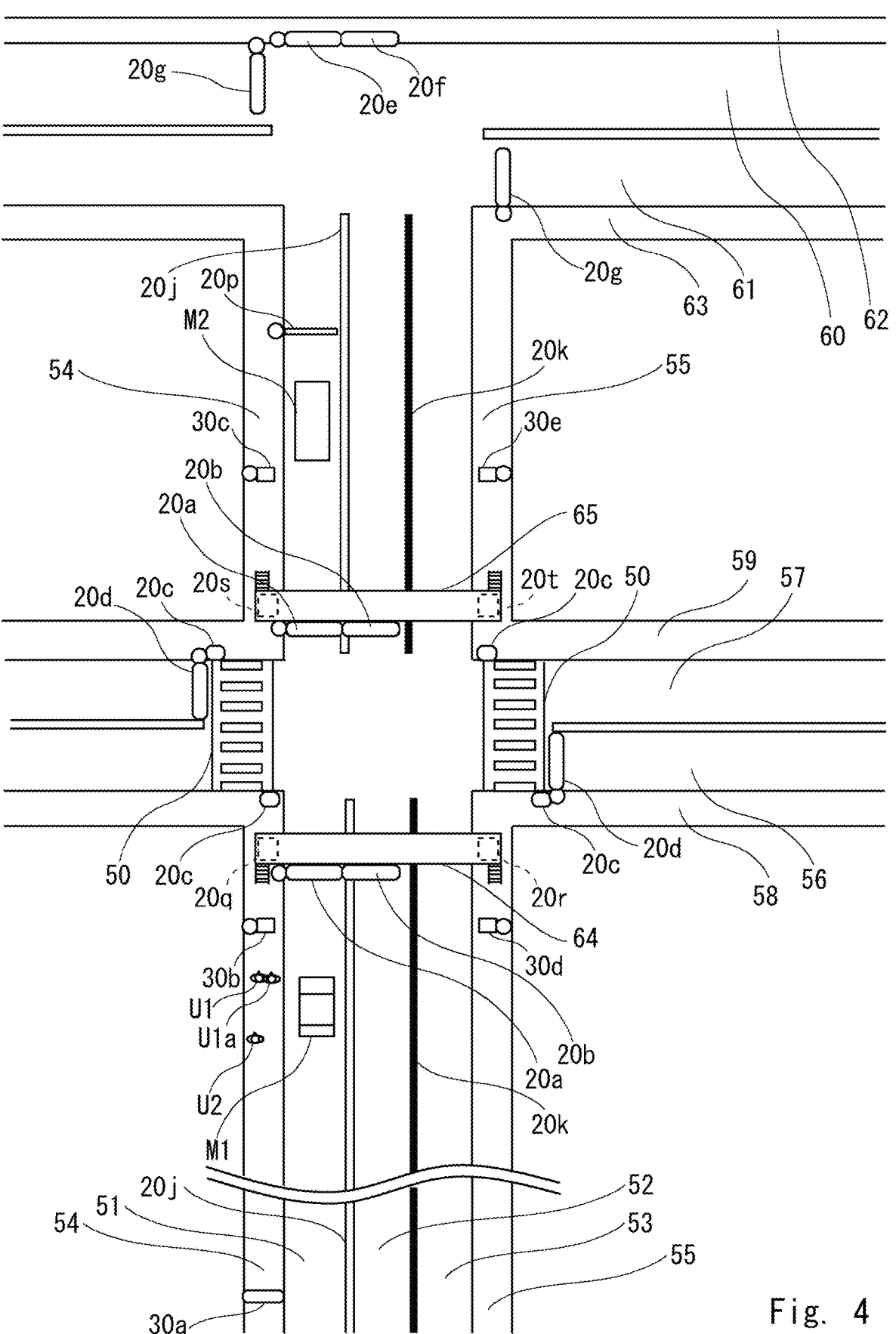
FIG. 4 is a schematic top view illustrating an arrangement example of traffic facilities in the system of FIG. 3.
Figure 5:
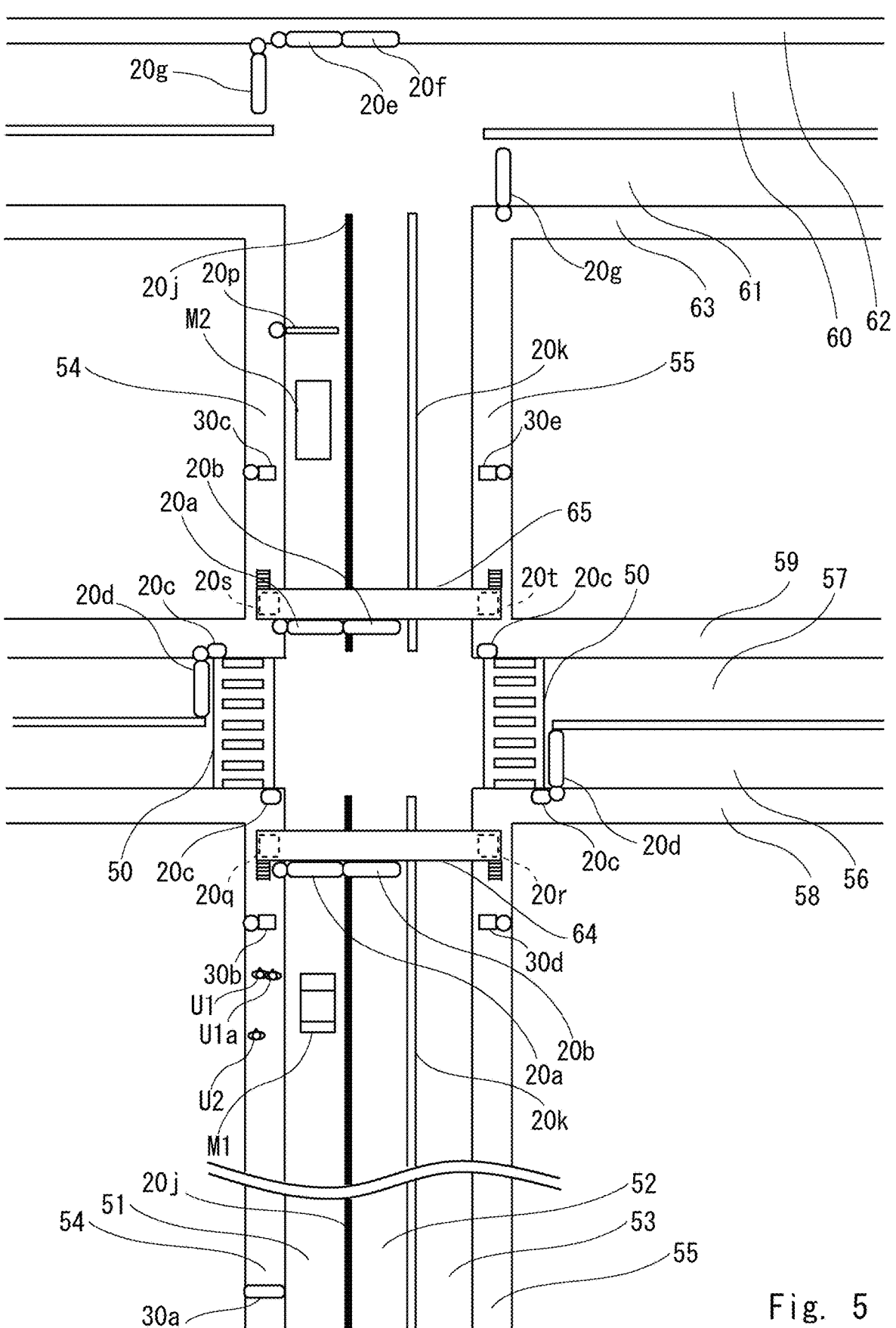
FIG. 5 is a schematic top view illustrating an arrangement example of the traffic facilities in the system of FIG. 3.
Figure 6:
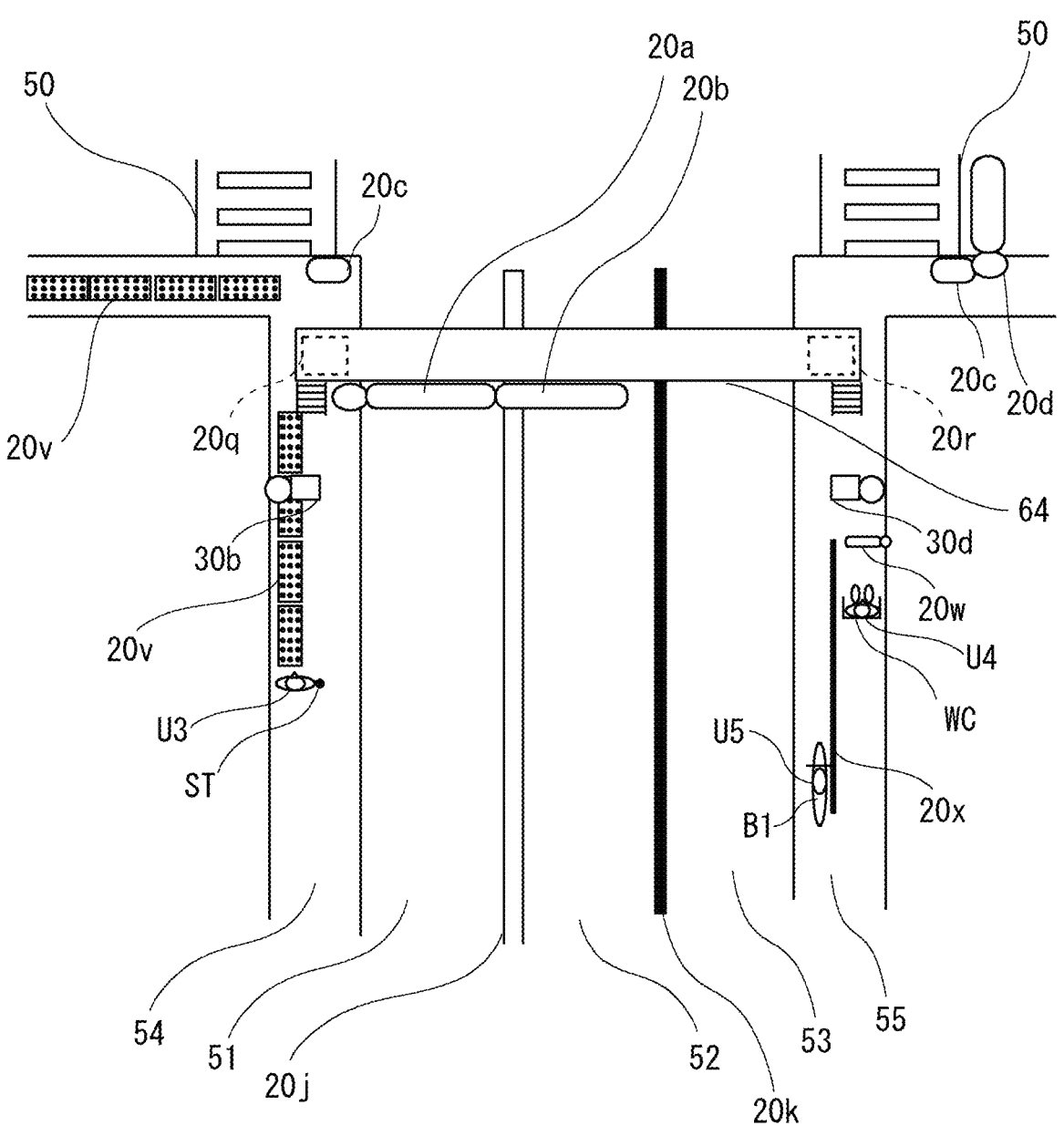
FIG. 6 is a schematic top view in which a part of the arrangement example of the traffic facilities of FIG. 4 is enlarged, and is a view illustrating another state.

Before describing an example of control for providing an incentive regarding the traffic facilities 20 in the system 2 shown in FIG. 3, an arrangement example of the traffic facilities 20 to which the control may be applied will be described with reference to FIGS. 4-6. FIGS. 4 and 5 are schematic top views each illustrating an arrangement example of the traffic facilities 20 in the system 2 shown in FIG. 3, and FIG. 5 is a view illustrating a state in which some of the traffic facilities have transitioned to a state different from that of FIG. 4 by the control. FIG. 6 is a schematic top view in which a part of the arrangement example of the traffic facilities of FIG. 4 is enlarged, and is a view illustrating another state. In FIG. 6, traffic facilities not illustrated in FIG. 4 are also illustrated.

In FIGS. 4 to 6, for convenience, only a part of a region in which the traffic facility 20 to be controlled by the incentive providing apparatus 10 is arranged is illustrated as an example. However, the region in which the traffic facility 20 to be controlled is arranged is not limited to this example, and may include a region outside the illustrated region. Furthermore, as described above, the region in which the traffic facility 20 to be controlled is arranged can also be a region designated on a town basis, a district basis, a prefecture basis, or the like, for example.

A region in which some or all of the traffic facilities 20 to be controlled by the incentive providing apparatus 10 are present may be, for example, a region including one main road and two small and medium roads as illustrated in FIGS. 4 to 6. In FIGS. 4 to 6, the main road is a road including lanes (roadways) 51 to 53 and sidewalks 54 and 55, the first small and medium road is a road including roadways 56 and 57 and sidewalks 58 and 59 and crossing the main road, and the second small and medium road is a road including roadways 60 and 61 and sidewalks 62 and 63 and forming a T-junction with the main road at the end of the main road.

In addition, in the region illustrated in FIGS. 4 to 6, two crosswalks 50 that cross the roadways 56 and 57 of the first small and medium road are provided, and pedestrian bridges 64 and 65 are provided in such a way as to be able to cross the roadways 51 to 53 of the main road by walking along the first small and medium road.

It is assumed that all the traffic facilities 20 to be controlled illustrated in FIGS. 4 to 6 are connected to the incentive providing apparatus 10 via a network, and are controlled according to a control signal transmitted from the control unit 11.

As illustrated in FIGS. 4 to 6, examples of the traffic facility 20 to be controlled include traffic lights 20a, 20b, 20d, 20e, 20f, and 20g, crosswalk traffic lights 20c, lifting type strips 20j and 20k, a digital signage 20p, elevators 20q, 20r, 20s, and 20t, a lifting type braille block 20v, a variable sign 20w, and a lifting type guard rail 20x. For convenience, a traffic light for the roadway 53 is not shown, but it is assumed that the traffic light is arranged at an appropriate position. It is a matter of course that the number and arrangement of the illustrated traffic facilities 20 are not limited thereto. In addition, the traffic facilities 20 to be controlled may be only a part of the illustrated traffic facility or may include other types of traffic facilities not shown.

The lifting type strips 20j and 20k each include a physical strip and a mechanism for lifting the strip, and it is possible to switch formation/non-formation of the strip by lifting the strip. Instead of the lifting type strips 20j and 20k, a configuration that enables switching between formation and non-formation of a strip by changing a display color can also be adopted.

For example, the lifting type strips 20j and 20k are controlled in such a way that the lifting type strips 20j and 20k are lifted in an opposite manner to make the main road a two-way road, and both the lifting type strips 20j and 20k are lowered to make the main road a one-way road. Hereinafter, in order to simplify the description, an example in which control is performed only in such a way as to make the main road a two-way road will be described.

As illustrated in FIG. 4, the lifting type strip 20j is lowered to a height substantially equal to surfaces of the roadways 51 and 52, so that it is possible to eliminate a partition between the roadways 51 and 52 to make them roadways in the same direction. In this case, an upper surface of the lifting type strip 20j may be colored in such a way as to be visually recognized as a white line, a white broken line, a yellow line, or the like of the road. In this state, the lifting type strip 20k is lifted higher than the surfaces of the roadways 52 and 53 to a height at which the roadways 52 and 53 that are opposite lanes may be separated from each other, so that a physical partition may be formed between the roadways 52 and 53 to make them roadways in opposite directions.

On the other hand, as illustrated in FIG. 5, the lifting type strip 20j is lifted higher than the surfaces of the roadways 51 and 52 to a height at which the roadways 51 and 52 that are opposite lanes may be separated from each other, so that a physical partition may be formed between the roadways 51 and 52 to make them roadways in opposite directions. In this state, the lifting type strip 20k is lowered to a height substantially the same height as the surfaces of the roadways 52 and 53, so that it is possible to eliminate a partition between the roadways 52 and 53 to make them roadways in the same direction. In this case, an upper surface of the lifting type strip 20k may be colored in such a way as to be visually recognized as a white line, a white broken line, a yellow line, or the like of the road.

Further, as another usage example, the lifting type strip 20j can change the roadway 51 to a sidewalk by being lifted higher than the surfaces of the roadways 51 and 52. In this case, the lifting type strip 20k can also be lifted higher than the surfaces of the roadways 52 and 53, so that a physical partition is formed between the roadways 52 and 53 to make them roadways in opposite directions.

The traffic lights 20a and 20b may be controlled to be the same lighting color in synchronization in some cases and may be controlled to be different lighting colors in some cases. As illustrated in FIG. 4, in the former case, the lifting type strip 20j is lowered to substantially the same height as the surfaces of the roadways 51 and 52, and the lifting type strip 20k is lifted higher than the surfaces of the roadways 52 and 53. In the latter case, as illustrated in FIG. 5, the lifting type strip 20j is lifted higher than the surfaces of the roadways 51 and 52, and the lifting type strip 20k is lowered to substantially the same height as the surfaces of the roadways 52 and 53. The traffic light 20d is controlled in such a way that the traffic light 20d is red (green) when the traffic light 20a is green (red). Further, one of the traffic lights 20a and 20d is controlled to be yellow in some cases, and in this case, the other is controlled to be red.

The traffic lights 20e and 20f are also controlled similarly to the traffic lights 20a and 20b, respectively, but since there is a difference in installation positions, there may be a time difference in control between the traffic lights 20a and 20e and between the traffic lights 20b and 20f. That is, traffic lights 20e and 20f may be controlled to be the same lighting color in synchronization and may be controlled to be different lighting colors. In the former case, the lifting type strip 20j is lowered and the lifting type strip 20k is lifted, and in the latter case, the lifting type strip 20j is lifted and the lifting type strip 20k is lowered. The traffic light 20g is controlled in such a way that the traffic light 20g is red (green) when the traffic light 20e is green (red). Further, one of the traffic lights 20e and 20g is controlled to be yellow in some cases, and in this case, the other is controlled to be red.

Further, in a case where the lifting type strip 20k illustrated in FIG. 5 is lowered and the lifting type strip 20j is lifted, the traffic lights 20b and 20f can display a text or a mark notifying that passing is prohibited.

All of the four crosswalk traffic lights 20c are traffic lights visually recognized when a pedestrian or the like crosses the crosswalk, and may be controlled in synchronization with one another. The crosswalk traffic light 20c is controlled to be green when the traffic light 20a is red, and is controlled to be red when the traffic light 20a is green or yellow. It is a matter of course that the crosswalk traffic light 20c can also be controlled to blink green a predetermined time before the traffic light 20a changes from red to green. The control between the traffic light 20a and the crosswalk traffic light 20c is not limited to these controls, and it is sufficient that a timing to change the lighting color is set in consideration of safety.

The digital signage 20p is a display apparatus that displays various notifications such as a preferable route or a route without traffic congestions, or a notification for prompting safe driving for a vehicle traveling on the roadway 51 in a state where the lifting type strip 20j is lifted or the roadways 51 and 52 in a state where the lifting type strip 20j is lowered, and is installed on the sidewalk 54, a pole provided near a boundary between the sidewalk 54 and the roadway 51, or the like.

The lifting type braille block 20v is a movable braille block including a main body embedded in a place suitable for use by a user who uses a white cane on the sidewalk 54, a plurality of rod-shaped members forming braille, and a mechanism that lifts and lowers the plurality of rod-shaped members with respect to the main body. The lifting type braille block 20v is configured to form braille by simultaneously lifting the plurality of rod-shaped members that form the braille, and to remove the braille by lowering the plurality of rod-shaped members to be substantially flush with an upper surface of the sidewalk 54 (the braille is not formed). As described above, in the lifting type braille block 20v, formation and non-formation of braille may be switched by lifting and lowering the plurality of rod-shaped members.

The variable sign 20w is a display apparatus that displays a road sign selected from among a plurality of road signs for a user, and is installed, for example, on a pole or the like provided on the sidewalk 55 as illustrated in FIG. 6.

The lifting type guard rail 20x includes a physical protection fence and a mechanism for lifting the physical protection fence, and formation and non-formation of the protection fence may be switched by lifting and lowering the protection fence. As illustrated in FIG. 6, for example, the lifting type guard rail may be installed in the vicinity of the center of the sidewalk 55 in a width direction in such a way that the lifting type guard rail 20x does not interfere with movement toward stairs of the pedestrian bridge 64 even when being lifted in a direction along the sidewalk 55. Instead of the lifting type guard rail 20x, a plurality of lifting type guard poles can also be used.

The elevators 20q and 20r are each an apparatus installed in the pedestrian bridge 64 and are each an apparatus that moves a user up and down between an upper sidewalk of the pedestrian bridge 64 and each of the sidewalks 54 and 55. The elevators 20s and 20t are each an apparatus installed in the pedestrian bridge 65 and are each an apparatus that moves a user up and down between an upper sidewalk of the pedestrian bridge 65 and each of the sidewalks 54 and 55.

Furthermore, as illustrated in FIGS. 4 to 6, the cameras 30b, 30c, 30d, and 30e corresponding to the camera 30 are installed on the sidewalks 54 and 55, etc., and the sensing zone 30a provided with sensors including the camera 30 is also installed at a point of the sidewalk 54 that corresponds to an entrance of the region. For example, the cameras 30b and 30c may be installed on poles provided on the sidewalk 54, and the cameras 30d and 30e may be installed on poles provided on the sidewalk 55. In the sensing zone 30a, the sensors and the like may be installed on an arch extending over both ends of the sidewalk 54, but the sensors and the like can also be installed on poles similarly to the camera 30b and the like.

In addition, FIGS. 4 to 6 illustrate a state in which users U1, U1a, U2, U3, U4, and U5, a white cane ST used by the user U3, a wheelchair WC on which the user U4 is riding, a bicycle B1 on which the user U5 is riding, an automobile M1, and an autonomous mobile body M2 such as an autonomous bus exist in the illustrated region. However, since users, automobiles, or the like are always moving, only a state of a moment is illustrated here. Here, the user U1a is an accompanying person of the user U1.

In the system 2 of the above configuration example, a control example of the traffic facility 20 in accordance with detection of a user or the like will be described with reference to FIG. 7. Here, only one example of control of the traffic facility 20 based on the stress level will be described, but various examples may be applied. For the sake of convenience, as an example of control by the control unit 11, a case where control is performed in such a way that a certain state occurs in a case where a condition defined by a stress level or the like is satisfied will be described. However, if the certain state is the same as the current state, it means that control is not substantially performed, and if the certain state is different from the current state, it means that control is performed in such a way that the certain state occurs.

FIG. 7 is a diagram illustrating an example of a table used for controlling the traffic facilities 20 in the traffic system 2 of FIG. 3. In FIG. 7, for convenience, the reference signs in FIGS. 4 to 6 are used as facility IDs for identifying the traffic facilities 20, but the present disclosure is not limited thereto.

A table 12t illustrated in FIG. 7 may be stored in the storage unit 12, for example, and may be referred to by the control unit 11 at the time of control. The table 12t can also be stored as a part of the facility information DB 12a or the like.

First, the cases illustrated in FIGS. 4 and 5 will be described.

In FIG. 4, the control unit 11 detects the presence of a user based on imaging data captured by the camera 30b, detects a facial expression of the user U1 based on the face image data included in the imaging data, and determines the stress level of the user U based on the facial expression. In a configuration example in which it is required to identify the user, at this stage, the control unit 11 may execute face authentication processing and the like based on face image data captured by the camera 30b and identify the user U1.

In a case in which the stress level of the user U1 detected by the camera 30b is lower than a predetermined first stress level (hereinafter Condition A), the control unit 11 controls the traffic facility 20 as illustrated below in order to give a preferential treatment to the user U1. In other cases, for example, the control unit 11 does not perform control of the traffic facility 20 according to the stress level, and may perform only control of the traffic facility 20 based on only other factors (e.g., a degree of congestion) unrelated to the user U1. Condition A refers to Condition A illustrated in the table 12t of FIG. 7, and hereinafter, Conditions B to E also refer to Conditions B to E illustrated in the table 12t, respectively.

In a case where Condition A is satisfied, the control unit 11 may control, for example, the crosswalk traffic light 20c to turn green after a predetermined time in consideration of a time when the user U1 reaches the crosswalk 50, or to lengthen the green phase. Accordingly, the lighting color of the traffic light 20a is similarly controlled, and the lighting color of the traffic light 20d is controlled to be opposite to that of the traffic light 20a. The crosswalk traffic light 20c is a crosswalk traffic light within a range of a predetermined distance from the camera and although a description thereof is omitted, similarly, the traffic facility 20 to be controlled may be determined according to the position of the camera 30b and the position of each traffic facility 20.

Furthermore, in a case in which it has been detected that a user U1a, who is an accompanying person, is present together with the user U1, the control unit 11 may determine the stress level of the user U1 by using a predetermined second stress level that is lower or higher than the first stress level as a predetermined standard. The information indicating the presence or the absence of the accompanying person may be one of the user's attribute information items. By setting the second stress level to be lower than the first stress level, it is possible to prioritize a user not accompanied by another person over a user accompanied by another person so that the user not accompanied by another person is likely to be provided with an incentive. On the other hand, by setting the second stress level to be higher than the first stress level, it is possible to prioritize a user accompanied by another person over a user not accompanied by another person so that the user accompanied by another person is likely to be provided with an incentive. It is a matter of course that the first stress level may be used to determine the user regardless of whether there is an accompanying person.

In a case where Condition A is satisfied, the following additional control may be performed. That is, the control unit 11 may further perform control to lower the lifting type strip 20*j* and lift the lifting type strip 20*k*. As a result, for the sidewalk 54 on which the user U1 having a low stress level is walking, the adjacent roadway is made to have two lanes including the roadways 51 and 52, so that it is possible to make the passage of vehicles comfortable. As a result, it is possible to improve the safety of the users U1 and U1*a* who are pedestrians passing through the sidewalk 54 adjacent to the roadway and thus the users U1 and U1*a* can walk without paying attention to vehicles.

Execution of such control may be determined depending on whether or not a traffic volume of vehicles such as the automobile M1, the autonomous mobile body M2, and the like is larger than a predetermined volume. In this case, the traffic volume may be calculated by analysis of imaging data captured by the cameras 30 installed at various places.

As an alternative example of the additional control, in a case where Condition A is satisfied, the control unit 11 can perform control to lift the lifting type strip 20*j* and also lift the lifting type strip 20*k*. In this case, the control unit 11 can also perform control in such a way that a change of the roadway 51 into a sidewalk is displayed on the traffic light 20*a*. As a result, the adjacent roadway 51 may be changed to a sidewalk for the sidewalk 54 on which the user U1 having a low stress level is walking, so that the safety of the users U1 and U1*a* may be improved and thus the users U1 and U1*a* can walk without paying attention to vehicles and other pedestrians.

Further, in a case where this alternative example is adopted, or for example, in a case where the lifting type strips 20*j* and 20*k* are not provided, although not shown, a lifting type strip, a lifting type guard rail, or the like is also provided between the original sidewalk 54 and the roadway 51, and in a case where Condition A is satisfied, the lifting type strip, the lifting type guard rail, or the like is lowered to add the roadway 51 as a sidewalk, and in a case where Condition A is not satisfied and the addition is not made, the lifting type strip, the lifting type guard rail, or the like may be lifted. As a result, in a case where it is desired to improve safety of pedestrians, it is possible to control the width of the sidewalk 54 to be increased by the width of the roadway 51 by lowering the lifting type strip or the like provided therebetween, and to control the width of the sidewalk in such a way that only the sidewalk 54 remains in other cases. Further, a configuration that enables switching between formation and non-formation of a boundary between the sidewalk and the roadway by changing a display color can also be adopted for the increase/decrease in width of the sidewalk 54 instead of using the lifting type strip or the like.

Even in a case where this alternative example is adopted, the execution of the control may be determined depending on whether or not a traffic volume of vehicles such as the automobile M1 and the autonomous mobile body M2 is larger than a predetermined amount. Furthermore, in a case where this alternative example is adopted, the control may not be performed in a time zone in which the autonomous mobile body M2 passes through the roadway 51 as illustrated in FIG. 4, and in the time zone, a two-lane road including the roadways 51 and 52 as illustrated in FIG. 4 is formed. In a time zone in which the autonomous mobile body M2 does not pass, control may be performed in such a way as to form a one-lane road as illustrated in FIG. 5.

In a case where Condition A is satisfied, as a further additional alternative example, the control unit 11 can control the digital signage 20*p* to make a notification of a control content of the traffic facility 20 other than a notification apparatus such as the digital signage 20*p*, for example, a control content of the traffic facility 20 in a predetermined region. As a result, it is possible to notify a person or a driver of a vehicle that the control content of the traffic facility 20 has changed.

As described above, the control unit 11 may control the notification apparatus provided as a part of the traffic facility 20 to make a notification according to a content of control for a facility other than the notification apparatus in the traffic facility. As a result, in the incentive providing apparatus 10, the notification apparatus may notify a user of a control content of the traffic facility 20 other than the notification apparatus, which causes the user to behave more proactively in such a way that his/her stress level is lowered and the safety may be further improved. In addition, the notification may be made only under a specific condition such as Condition A. However, the notification may be made in any case under a condition where the traffic facility 20 is controlled. Alternatively, a case in which control that requires a notification such as calling attention under conditions other than a specific condition such as Condition A may be possible. In this case, this notification may not be sent under a specific condition such as Condition A and may be sent in other cases.

The notification apparatus is not limited to the display apparatus such as the digital signage 20*p*, and examples thereof include a sound output apparatus and a display apparatus having a sound output function. The notification apparatus may be installed at a place where the control content affects a user, between the place and a place where the user is detected, or the like. In a case where a notification of the control content is made, a notification for a calling attention necessary in accordance with the control content, if any, may be sent at the same time. On the other hand, in a case where a notification of the control content is not made, the control unit 11 may control the notification apparatus to make a notification of a normal notification content such as "Please pass safely".

In addition, a content notified by the notification apparatus at the time of controlling the traffic facility 20 can also be notified to a terminal apparatus used by the user U1 or the users U1 and U1*a* by an instant message, an e-mail, or the like. The terminal apparatus may be a portable terminal apparatus or the like used by a user. In addition, since it is necessary to identify a user or a terminal apparatus used by a user for the notification, the incentive providing apparatus 10 includes the identification unit.

Then, the incentive providing apparatus 10 may include a notification unit that notifies a terminal apparatus used by a user (for example, the user U1 in this example) identified by the identification unit according to the content of control for the traffic facility 20. The notification content in this case may be, for example, only a schematic control content such as "such control will be performed", or can include personal information of the user identified by the identification unit, so that it is possible to reassure the user by making a notification that the traffic facility 20 is being controlled for the user as a target. After controlling the traffic facility 20 according to movement of the user, the incentive providing apparatus 10 may also delete information indicating that the user is at the position or information other than the information necessary for the notification, and in this case, the notification content can include deletion of the information to reassure the person.

As described above, the incentive providing apparatus 10 is configured to notify a terminal apparatus used by a user of a control content of the traffic facility 20 for the user, so that it is possible to reassure the user, whereby it is possible to cause the user behave more proactively in such a way that his/her stress level is lowered.

Further, in a case in which Condition A is not satisfied, that is, in a case in which the stress level of the user U1 is equal to or larger than the first stress level (hereinafter Condition B), the control unit 11 may perform control that is opposite to that performed in a case where Condition A is satisfied. For example, the control unit 11 may control the traffic facility 20 as will be illustrated next.

In a case where Condition B is satisfied, since the user U1 feels irritated, control in accordance with the idea that it is good to let the user U1 wait for the traffic light and walk safely may be adopted. Therefore, the control unit 11 may control, for example, the crosswalk traffic light 20c to turn red after a predetermined time considering a time taken for the user U1 to arrive at the crosswalk 50. Accordingly, the lighting color of the traffic light 20a is similarly controlled, and the lighting color of the traffic light 20d is controlled to be opposite to that of the traffic light 20a.

In a case in which Condition B is satisfied, the control unit 11 can perform additional control opposite to that in a case where Condition A is satisfied on a lifting type strip such as the lifting type strip 20j. In the case in which Condition B is satisfied, for example, the control unit 11 may perform control to lift the lifting type strip 20j and lower the lifting type strip 20k. However, in a case where Condition B is satisfied, for example, unlike a case where Condition A is satisfied, it may not be necessary to determine execution depending on the traffic volume of vehicles. On the other hand, in a case in which Condition B is satisfied as well, the example of the increase/decrease in the width of the sidewalk, which has been described as an alternative example of additional control in a case where Condition A is satisfied, may be applied, although the increase and the decrease are opposite to those in a case where Condition A is satisfied. Further, the example of sending the notification of the control content or the like to the digital signage 20p, the terminal apparatus or the like may also be applied.

In addition, even in a case where the user U2 who is an elderly person has been detected instead of the users U1 and U1a, the control unit 11 is able to make a determination using a predetermined third stress level as a predetermined standard. Then, in a case in which the stress level of the user U2 is lower than the third stress level, the control unit 11 may perform control similar to that in a case in which Condition A is satisfied. On the other hand, in a case in which the stress level of the user U2 is equal to or higher than the third stress level, the control unit 11 may perform control similar to that in a case in which Condition B is satisfied. The elderly person may be defined, for example, as a person who is in or above a certain age group. As described above, the third stress level may be set higher than the first stress level so that an incentive is more likely to be provided for an elderly person. On the other hand, the third stress level may be set lower than the first stress level so that an incentive is less likely to be provided for an elderly person.

Next, a scene shown in FIG. 6 will be described. In this scene, the user U3 walks using the white cane ST, the user U4 moves on the wheelchair WC, and the user U5 travels on the bicycle B1. The user U3 is detected by the camera 30b, and the users U4 and U5 are detected by the camera 30d.

Each of the white cane ST and the wheelchair WC may be detected as a kind of carried objects that hinder the movement of the user U3 and that of the user U4 (hereinafter each of these carried objects will be referred to as a "carried object that inhibits movement") from imaging data of the camera. It is assumed that the stress level of the user in a case in which he/she carries an object that inhibits his/her movement will be higher than that in a case in which he/she does not carry this object. In a case in which the stress level is determined based on, for example, vital information, it can be said that the presence or the absence of the carried object that inhibits movement is also reflected in the vital information. On the other hand, in a case in which the stress level is to be determined by a determination method in which the presence or the absence of the carried object that inhibits movement is not reflected, the predetermined standard may be changed depending on the presence or the absence of the carried object that inhibits movement so that the presence or the absence of the carried object that inhibits movement may be reflected. That is, the presence or the absence of the carried object that inhibits movement may be treated as one kind of attribute information and a predetermined standard regarding a user who has a carried object that inhibits movement may be set larger than that regarding a user who does not have a carried object that inhibits movement. The bicycle B1, however, may be detected as an object that lowers the stress level of the user U5, and riding/non-riding of the bicycle may be treated as one kind of the attribute information. Therefore, in a case in which the stress level is to be determined by a determination method in which the presence or absence of the bicycle is not reflected, the predetermined standard may be set smaller in a case in which the user is riding a bicycle than that in a case in which the user is not riding a bicycle.

In a case where the user U3 who uses the white cane ST has been detected by the camera 30b (hereinafter Condition C), the control unit 11 controls the lifting type braille block 20v that is close to the camera 30b to lift the bar-shaped members unconditionally regarding the stress level, thereby causing a braille block to appear. Further, in a case where the stress level of the user U3 who uses the white cane ST in which the presence or absence of the white cane ST is not reflected is lower than a predetermined fourth stress level, the control unit 11 may perform the control described with Condition A at the same time. Alternatively, in a case where the stress level of the user U3 who uses the white cane ST which is based on the vital information is lower than a first stress level, the control unit 11 may perform the control described with Condition A at the same time.

As described above, in the control of the lifting type braille block 20v, the braille block may appear when the user U3 using the white cane ST is detected. In addition, control based on a condition different from Condition C may also be performed. For example, the lifting type braille block 20v may appear by default and may be retracted by lowering the bar-shaped members when a user carrying a suitcase is detected.

In a case where the user U4 who uses the wheelchair WC has been detected by the camera 30d (hereinafter, Condition D), the control unit 11 performs control to display a mark, a text, or the like indicating that it is a wheelchair zone (a bicycle-traveling-prohibited zone) on the variable sign 20*w* close to the camera 30*d* unconditionally regarding the stress level.

Further, in a case where a stress level of the user U4 who uses the wheelchair WC in which the presence or absence of the wheelchair WC is not reflected is lower than a predetermined fifth stress level, the control unit 11 may perform control as described with regard to Condition A at the same time. Note that either the fourth stress level or the fifth stress level may be set higher than the other one or the fourth and fifth stress levels may be the same. Alternatively, in a case in which the stress level of the user U4 who uses the wheelchair WC based on vital information is lower than the first stress level, the control unit 11 may perform control as described with regard to Condition A at the same time. However, in both the control as described with regard to Condition A performed in the case in which the stress level of the user U4 is lower than the fifth stress level and the control as described with regard to Condition A performed in the case in which the stress level of the user U4 is lower than the first stress level, the control of the lifting type strips 20*j* and 20*k* is simply opposite to that in a case where Condition A is satisfied since the moving direction of the user U4 is the same as that of the user U1 and the user U4 moves on the sidewalk 55 instead of the sidewalk 54.

Furthermore, as one of the traffic facilities 20, for example, a display apparatus that displays a crosswalk parallel to the pedestrian bridge 64 on a road surface may be provided, and when a wheelchair and/or an elderly person is detected, the crosswalk may be displayed by the display apparatus.

In a case where the user U5 who rides the bicycle B1 has been detected by the camera 30*d* and the stress level of the user U5 in which the presence or the absence of the bicycle B1 is not reflected is lower than a predetermined sixth stress level (hereinafter Condition E), the control unit 11 performs control to lift the lifting type guard rail 20*x* close to the camera 30*d*. As a result, a bicycle zone may be formed on the sidewalk 55, the user U5 is able to travel without paying attention to other pedestrians and the like, and further the safety of other pedestrians is improved. Further, in a case where a bicycle zone is formed, the fact that it is a bicycle zone may be displayed on a display apparatus similar to the variable sign 20*w*.

Conversely, the control unit 11 can also perform control to cause the lifting type guard rail 20*x* to appear when a user who uses a white cane or a user who is staggering is detected. That is, a condition corresponding to a case where a user who uses a white cane or a user who is staggering is detected may also be included in Condition E.

In addition, even in a case where Condition D is satisfied, the control unit 11 can also perform control to lift the lifting type guard rail 20*x* for the purpose of protecting a user in a wheelchair or an elderly person or for the purpose of providing a handrail for an elderly person.

Condition E may be satisfied only in a case in which the user U5 who rides the bicycle B1 has been detected by the camera 30*d*, that is, regardless of the stress level of the user U5. In this case, in a case in which the stress level of the user U5 who rides the bicycle B1 in which the presence or the absence of the bicycle B1 is not reflected is lower than a predetermined sixth stress level, the control unit 11 may further perform control as described with regard to Condition A at the same time. Alternatively, in a case in which the stress level of the user U5 who rides the bicycle B1 based on the vital information is lower than the first stress level, the control unit 11 may perform control as described with regard to Condition A at the same time.

Hereinabove, the control example has been described by exemplifying the simple conditions as Conditions A to E, but the present disclosure is not limited thereto, and various application examples, in which, for example, control of the traffic facility 20 is performed based on detection of a camera 30 having a higher priority according to user detection states of the cameras 30, may be applied. In addition, the stress level of the user may change during movement on a road. Therefore, for example, the control unit 11 may also perform control of the traffic facility 20 such as changing a timing at which a crosswalk traffic light 20*c* turns green and/or a length of a green phase of the crosswalk traffic light 20*c* based on a change in stress level of a user, such as a change in stress level before and at the time of reaching the crosswalk.

In addition, in the above description, the control of the traffic facility 20 is basically performed based on a stress level of a user, and in some examples, a control example based on attribute information or a traffic volume is described, but control based on other information can also be performed.

For example, the control of the traffic facility 20 may be changed based on an attention of a user to the surroundings. Such an attention varies, for example, depending on a situation in which the user views a portable terminal apparatus. Therefore, the incentive providing apparatus 10 may include a viewing determination unit (not shown) that determines whether or not a user is viewing a portable terminal apparatus. Here, the portable terminal apparatus that is a determination target may be any apparatus, and for example, it is possible to determine whether or not the portable terminal apparatus is held by determining whether or not the portable terminal apparatus corresponds to one or a plurality of objects having a predetermined shape in the imaging data. Furthermore, in a case where there is a possibility that the user is looking at the portable terminal apparatus, for example, the face is directed to the portable terminal apparatus, it may be determined that the user is viewing the portable terminal apparatus. As can be seen from this example, the viewing determination unit may be implemented by, for example, the control unit 11 and information for determination stored in the storage unit 12.

Then, the control unit 11 may control a traffic facility based on a stress level of a user and a determination result in the viewing determination unit. For example, the control unit 11 may not control the traffic facility in accordance with a stress level of the user for a user who is viewing a portable terminal apparatus since this user cannot know that there may be a change in the traffic facility if the traffic facility is changed, and may control the traffic facility in accordance with a stress level of the user only for a user who is not viewing the portable terminal apparatus. With such a configuration, the incentive providing apparatus 10 can control the traffic facility 20 in consideration of whether or not a user is viewing a portable terminal apparatus, and can provide an incentive in view of safety as well.

In addition, the incentive providing apparatus 10 may include a prediction unit (not shown) that predicts a direction in which a user moves. The user regarding whom the moving direction is to be detected may be a user regarding whom the stress level has been determined or a user identified by the identification unit.

The prediction unit may be implemented by, for example, the control unit 11 and information necessary for prediction stored in the storage unit 12. In this case, the control unit 11 can determine, for example, an orientation of the face (a direction of a line of sight) of a user and predict that the user moves in a direction matching the orientation of the face on map data stored in the storage unit 12. This is because a user may direct his/her gaze to a direction in which the user is to move next.

Alternatively, the prediction unit may be implemented by the control unit 11 and the communication unit 13. In the latter case, it is sufficient if the control unit 11 performs control to receive the prediction result from the portable terminal apparatus of the user via the communication unit 13. In this case, in a case where the user uses a navigation system incorporated in the portable terminal apparatus, the control unit 11 can acquire route information or destination information via the communication unit 13 and use the information as the prediction result.

Then, the control unit 11 controls the traffic facility 20 based on the predicted direction in which the user moves and the stress level of the user. In particular, the control unit 11 may determine the traffic facility 20 to be controlled in a case in which the stress level is lower than a predetermined standard based on the predicted direction in which the user moves. For example, the control unit 11 controls the traffic facility 20 that is located near the current position of the user and in the direction in which the user moves based on the stress level of the user. As a result, the incentive providing apparatus 10 may control the traffic facility 20 in consideration of a result of predicting a direction in which a user moves. The control unit 11 controls, for example, a traffic facility 20 near a user whose stress level is the lowest among users having stress levels lower than a predetermined standard, and is thus able to eliminate an influence on others when controlling even a distant traffic facility 20.

An example of control in consideration of the prediction result will be described. For example, in a case where it is found that the users U1 and U1*a* are scheduled to move from the sidewalk 54 to the sidewalk 55 with reference to such a prediction result and Condition A is satisfied, the control unit 11 can perform the following control. That is, the control unit 11 may control the elevator 20*q* of the pedestrian bridge 64 to be lowered after a predetermined time considering a time taken to reach the elevator 20*q* and standby. In addition to such control, the control unit 11 may further perform control in such a way as to lift the elevator 20*r* after a predetermined time considering a time taken to reach the elevator 20*r* by walking through the pedestrian bridge 64 or the like. In addition, at the time of these controls, doors of the elevators 20*q* and 20*r* may be opened for a longer time.

The control of the elevators 20*q* and 20*r* can also be applied to a case where the prediction unit is not provided. That is, in a case where the control condition is satisfied, the control unit 11 can perform control to lower the elevator on a side close to the pedestrian in the pedestrian bridges 64 and 65, and can further perform control to lift the elevator on a side away from the pedestrian at the same time or slightly later. In addition, the control unit 11 can also perform control to open the door of the elevator for a longer time in a case where the control condition is satisfied. In particular, when the control condition includes a user having a carried object that inhibits movement, such as a user using a cane (a white cane or a normal cane) or a wheelchair, such control can prevent a situation in which a user having a carried object that inhibits movement is sandwiched between the doors of the elevator.

In addition, as described with the example of the bicycle B1, a stress level of a user who uses a mobile body may be determined as the user to be determined. That is, the stress level of the user determined in this case refers to a stress level in a case where the user moves using the mobile body. Here, in addition to the bicycle, various types of mobile bodies such as the autonomous mobile body M2, the automobile M1, and a motorcycle may be applied as the mobile body, and it does not matter whether or not the mobile body can autonomously move.

In this example, the control unit 11 may control, in a case in which the stress level of the user is lower than a predetermined standard, a traffic facility 20 installed in at least one of the vicinity of the current position of the mobile body, a position on a route along which the mobile body moves, or a position along the route. As a result, even in a case in which the user moves using a mobile body, it becomes easy for the incentive providing apparatus 10 to let the user behave in such a way that his/her stress level is lowered. In this example, instead of identifying a user or in addition to identification of a user, the aforementioned identification unit is able to identify the mobile body used by this user. In addition, in a case in which there is a necessary notification, the notification may be transmitted to this mobile body. For example, the control unit 11 may perform control to display a preferable route or a route without traffic congestions by using a road surface, a signboard, or the like for a mobile body that the user whose stress level is low is riding.

Furthermore, in a case in which the stress level of the user is lower than a predetermined standard regardless of whether or not a user is using a mobile body, the control unit 11 may also be configured to control an autonomous mobile body that autonomously travels on a route on which a traffic facility 20 is installed together with the traffic facility 20. That is, in a case in which the stress level of the user is lower than a predetermined standard, the control unit 11 not only controls the traffic facility 20 but also optimally controls an autonomous mobile body that autonomously travels on a route on which the traffic facility 20 to be controlled is installed, together with the traffic facility 20.

Here, in a case in which the user whose stress level is to be determined is using a mobile body, the aforementioned autonomous mobile body, which is a target to be controlled, may be another autonomous mobile body traveling in the same area or may be the mobile body itself used by the user. More specifically, in a case in which there is a user who has determined to have a low stress level, the control unit 11 is able to control the upper limit of the speed of the autonomous mobile body on which this user rides to raise this upper limit, thereby causing the autonomous mobile body to arrive at a destination early. Here, for example, the upper limit of the speed may be raised by tuning how the autonomous mobile body travels in automatic driving. Furthermore, the control unit 11 may perform control to cause an autonomous mobile body on which a user whose stress level is low is riding to change a traveling route to a route with less curves in addition to or instead of raising the upper limit of the speed, as a result of which it is possible to let the user be in the autonomous mobile body in a comfortable manner. For example, the control unit 11 may perform control to set a preferable route such as a route with less curves on an autonomous mobile body on which a user whose stress level is low is riding. In a case in which the target to be controlled is set to be another autonomous mobile body traveling in an area the same as an area where the autonomous mobile body on which the user rides travels, the route or the like of the latter autonomous mobile body may be controlled so as to prioritize the traveling of the former autonomous mobile body.

The control unit 11 may control any type of autonomous mobile body. However, for example, the control unit 11 may perform different control between a case where a certain user is riding a certain type of autonomous mobile body and a case where a certain user is riding another type of autonomous mobile body.

As described above, by expanding a range of the facility to be controlled to an autonomous mobile body used by a user or another autonomous mobile body traveling in the same area, it becomes easy for the incentive providing apparatus 10 to let this user behave in such a way that his/her stress level is lowered.

As described above with reference to various examples, according to this embodiment, in a case in which the stress level of the user is lower than a predetermined standard, an incentive is provided for this user, whereby it becomes easy to let the user behave in such a way that his/her stress level is lowered. While at least one of electronic money, virtual currency, or points that may be used in a product purchasing service, a product, and control on the traffic facility 20 have been illustrated as incentives, two or more of them may be concurrently provided or a configuration in which other types of incentives that are not illustrated are provided may be adopted.

In addition, the incentive providing apparatus 10 may include an inquiry unit (not shown) that inquires a terminal apparatus used by a user identified by the identification unit about whether or not to perform processing for providing an incentive based on a stress level of a user. The terminal apparatus may respond to the inquiry by incorporating an application program for responding to the inquiry. As a result, the incentive providing apparatus 10 may determine whether not to perform incentive provision processing in consideration of a user's desire such as whether or not to enjoy a service of receiving an incentive, that is, in such a way that the user's desire is respected.

The inquiry may be made before the user whose stress level is to be determined is detected by the camera 30 or the like or may be, for example, in accordance with the following timing. That is, when a user passes through the position of the sensor such as the camera 30, the stress level of this user may be acquired or a user is determined, and at this timing, an inquiry about whether or not the user would like incentive provision processing to be executed in accordance with his/her stress level may be made to the terminal apparatus of the user. At any timing, the control unit 11 receives the response and determines whether or not to execute incentive provision processing according to the response. As a result, it is possible to respect the user's desire, and the user can be reassured, knowing that he/she is the target person for which an incentive is to be provided.

When the inquiry is sent, the content of an incentive to be provided may be selected by a user. As a result, it is possible to execute incentive providing processing in accordance with the stress level by further reflecting a user's desire.

Figure 8:
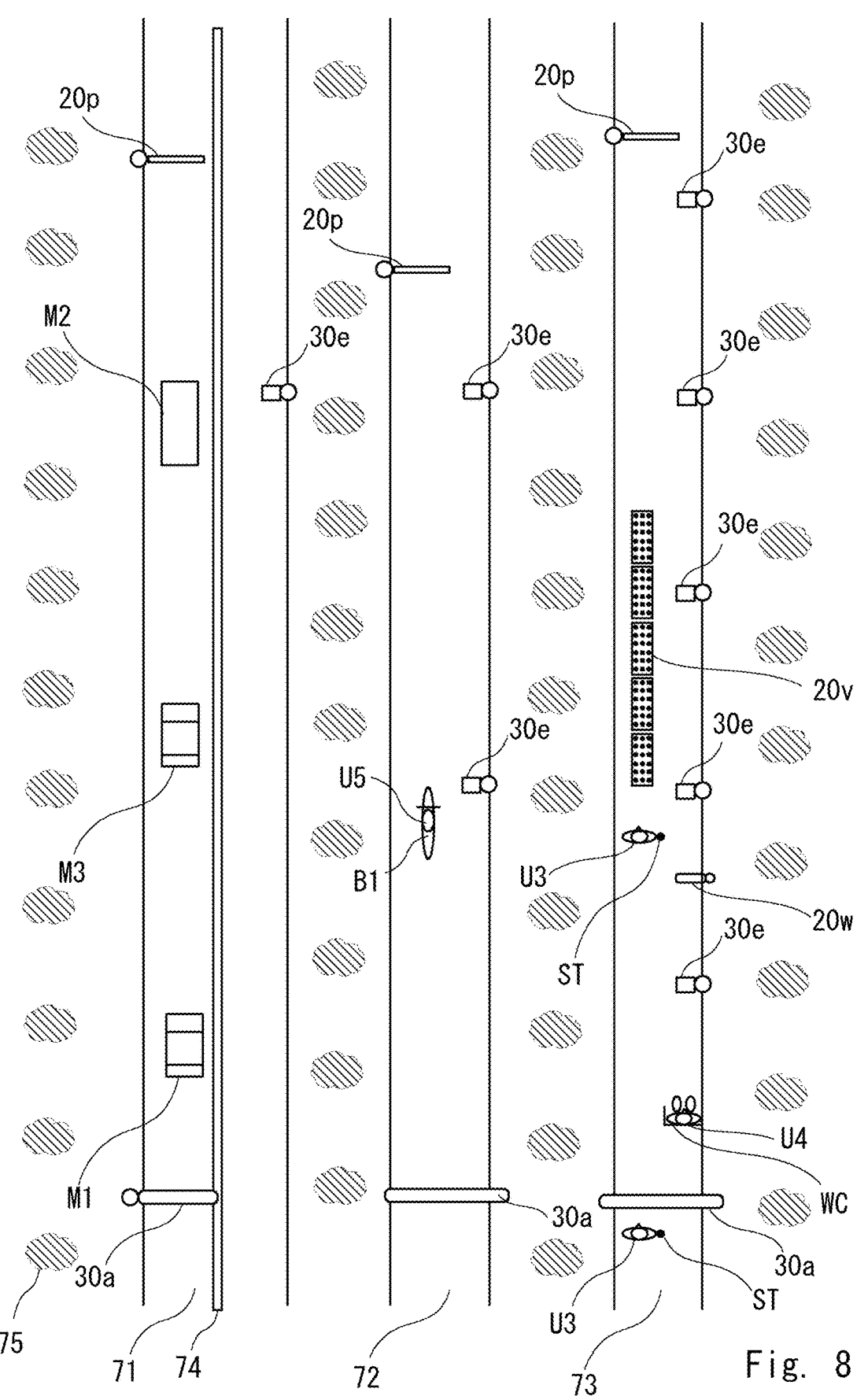
FIG. 8 is a schematic top view illustrating another arrangement example of the traffic facilities in the system of FIG. 3.

Referring next to FIG. 8, an arrangement example of the traffic facilities 20 that is different from that shown in FIGS. 4-6 will be described. FIG. 8 is a schematic top view illustrating another arrangement example of the traffic facility 20 in the system 2 shown in FIG. 3.

As illustrated in FIG. 8, a part of traffic network may also be a road group of which targets are determined, such as a road 71 for the exclusive use of automobiles and motorcycles, a road 72 for the exclusive use of bicycles, and a road 73 for the exclusive use of pedestrians. Here, the road 72 for the exclusive use of bicycles may be defined as, for example, an exclusive road on which a low-speed personal mobility travels or an exclusive road on which a bicycle and the personal mobility travel. Each of the roads 71 to 73 is illustrated as a straight line for convenience, but may include a curve or the like. Although the exclusive road 71 is illustrated as a two-lane road including an opposite lane, the exclusive road 71 may be a one-way road of one or more lanes, and a road that heads in the opposite direction and is similar to the exclusive road 71 in this case may be provided.

Also in the traffic network illustrated in FIG. 8, the sensing zone 30a and the cameras 30e are installed on the exclusive road 71, and as an example of the traffic facility 20, a lifting type strip 74 equivalent to the digital signage 20p and the lifting type strip 20j is installed. In addition, the sensing zone 30a and the cameras 30e are installed on the road 72 for the exclusive use of bicycles, and the digital signage 20p is installed as an example of the traffic facility 20. In addition, the sensing zone 30a and the cameras 30e are installed on the road 73 for the exclusive use of pedestrians, and the digital signage 20p, the lifting type braille block 20v, and the variable sign 20w are installed as examples of the traffic facility 20. It is a matter of course that the installation intervals of the cameras 30e, the position of the sensing zone 30a, and the like are not limited and other types of traffic facilities 20 may be installed on each of the roads 71 to 73. In FIG. 8, trees 75 are planted beside each of the roads 71 to 73.

In the aforementioned configuration, the control unit 11 controls the traffic facility 20 in a case in which the stress level of the user is lower than a predetermined standard. As compared with the regions illustrated in FIGS. 4 to 6, the frequency of control is reduced as there is no intersection, but the control unit 11 controls, in a case in which the stress level of the user is lower than a predetermined standard, the appropriate traffic facility 20 in such a way that the user or the mobile body used by this user is able to preferentially move.

For example, in a case where the control unit 11 has detected that the autonomous mobile body M2 on which a user whose stress level is lower than a predetermined standard is riding is traveling on the exclusive road 71, the control unit 11 may perform control to lift the upper limit of the speed of the autonomous mobile body M2 and perform control to display the fact on the digital signage 20p, thereby notifying the other automobiles M1 and M3.

Furthermore, for example, in a case in which the control unit 11 has detected the bicycle B1, on which the user U5 whose stress level is lower than a predetermined standard U5 is riding, on the road 72 for the exclusive use of bicycles, the control unit 11 may perform control to display sightseeing information or the like on the digital signage 20p.

Furthermore, for example, in a case where the control unit 11 has detected a user having a carried object that inhibits movement, such as the user U4 using the wheelchair WC or the user U3 using the white cane ST, on the road 73 for the exclusive use of pedestrians, the control unit 11 performs control to display a notification for notifying other users that there is a user using a wheelchair or white cane on the variable sign 20w or the digital signage 20p. Furthermore, in a case where the control unit 11 has detected the user U3 using the white cane ST, the control unit 11 controls the lifting type braille block 20v to lift the bar-shaped members to make the braille block appear.

In addition, for example, other mobile bodies may enter a road for the exclusive use of automobiles, a road for the exclusive use of motorcycles, a road for the exclusive use of automobiles and motorcycles, a road for the exclusive use of bicycles, a road for the exclusive use of pedestrians, and the like. For example, a pedestrian may enter a road for the exclusive use of automobiles, or a vehicle may enter a road for the exclusive use of pedestrians. Therefore, even in a case where such a person or vehicle not suitable for use of the exclusive road enters, the control unit 11 may control another type of traffic facility 20 in such a way as to display a warning on the notification apparatus or to prevent the pedestrian from being injured.

Figure 9:
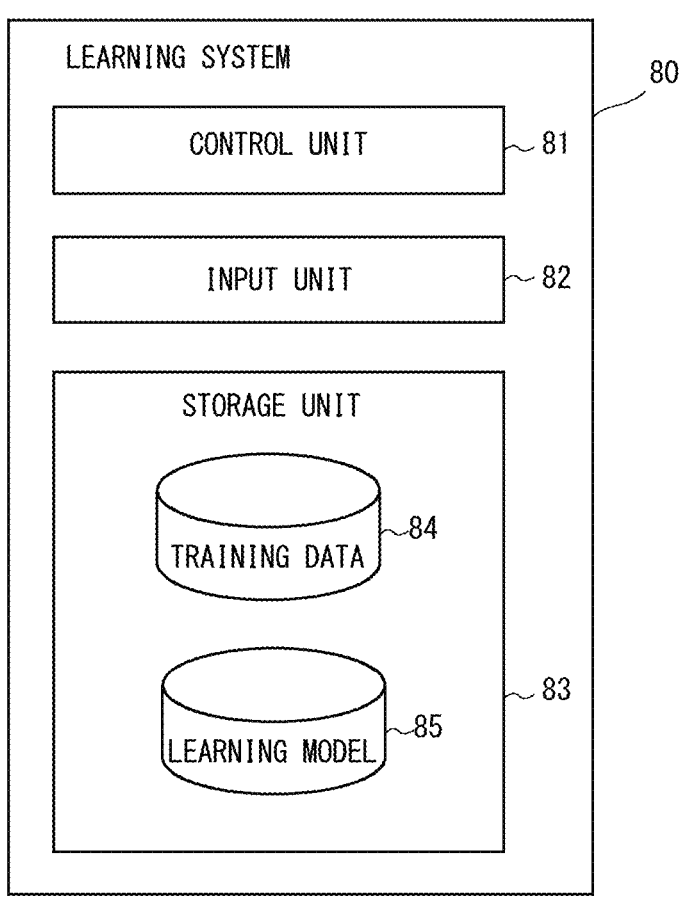
FIG. 9 is a block diagram illustrating a configuration example of a learning system that generates a learning model used in the system of FIG. 3.

Lastly, with reference to FIGS. 9 and 10, a configuration example of the learning system that generates the above-mentioned various learning models will be described. FIG. 9 is a block diagram illustrating a configuration example of the learning system that generates the learning model used in the system 2 shown in FIG. 3. FIG. 10 is a diagram illustrating one example of the training data used in the learning system shown in FIG. 9.

A learning system 80 illustrated in FIG. 9 may include a control unit 81, an input unit 82, and a storage unit 83. The learning system 80 may be constructed using, for example, a computer such as an artificial intelligence (AI) training PC. However, the learning system 80 may be implemented by a single apparatus or may be implemented by distributing functions to a plurality of apparatuses.

The control unit 81 controls the entire learning system 80. The control unit 81 may be implemented by, for example, an integrated circuit, and may be implemented by, for example, a processor, a work memory, a nonvolatile storage apparatus, and the like. A control program executed by the processor is stored in the storage apparatus, and the processor reads the program to the work memory and executes the program, so that the function of the control unit 81 may be performed. The control program can include a training program for executing training. As the storage apparatus, the storage unit 83 can also be used.

The input unit 82 can include at least one of an interface for performing a data input operation or a communication interface for inputting data from an external apparatus by communication. The input unit 82 inputs a data set of the training data 84 necessary for training, and stores the data set in the storage unit 83 so that the data set may be referred to during training. The storage unit 83 can store the training data 84 and can store a learning model 85 as an untrained model.

In the processing performed by the learning system 80, it is sufficient if the control unit 81 causes the learning model 85 as an untrained model to perform machine learning based on the training data 84, thereby training the learning model 85 to be a trained model. Furthermore, in a case where retraining is necessary, the learning model 85 as a trained model may be retrained based on a newly prepared data set.

The training data 84 in a case of generating the learning model 12$c$ may be a data set including at least one of the vital information or the imaging data, and the ground truth data, as described above, but may be, more specifically, a data set as illustrated in FIG. 10, for example. The data set illustrated in FIG. 10 includes, as explanatory variables, pulse rate information and body temperature information which are part of the vital information, and includes, as an objective variable, the stress level. This stress level includes a value obtained, for example, from the person himself/herself. Here, an example in which a stress level is expressed at three levels of high, normal, and low is illustrated, but the present disclosure is not limited thereto. In this case, to the predetermined standard may be set, for example, to be "normal", and an incentive may be provided in a case in which the stress level is lower than this predetermined standard, that is, in a case in which the stress level is "low".

Further, as described above, the training data 84 in a case in which the learning model 12$c$ is generated may include imaging data as well.

Furthermore, as described above, the learning model 12$c$ may be a learning model set for each user. In this case, the training data 84 in a case where the learning model 12$c$ for each user is generated may be a data set for the target user. Further, according to a configuration including the above-mentioned inquiry unit, it is possible to inquire whether or not to permit to generate a learning model 12$c$ for an individual, generate a learning model 12$c$ for all the users permitted, and store the obtained learning model 12$c$ for each user. At the time of operation, it is possible to input the acquired vital information or the like into the learning model 12$c$ for the user identified by the identification unit and output the stress level.

In addition, as described above, the learning model 12$c$ may be constructed, for example, as one learning model that receives at least one of vital information of a user and imaging data obtained by imaging a user and outputs the traffic facility 20 or the target management system 21 to be controlled and a control content. In this case as well, the learning model 12$c$ may be constructed as a learning model for each user. Further, the learning model may be generated so that the learning model can be used in the face authentication processing, the gait authentication processing and the like in the aforementioned identification unit. Even in a case in which other learning models are generated, like in these examples, only the algorithm, training data or the like is different, and thus a similar learning system is available.

OTHER EMBODIMENTS

The incentive providing system according to the embodiment described above is not limited to the configuration example described above and is not limited to the configuration for executing the processing example described above as long as the functions may be implemented.

Figure 11:
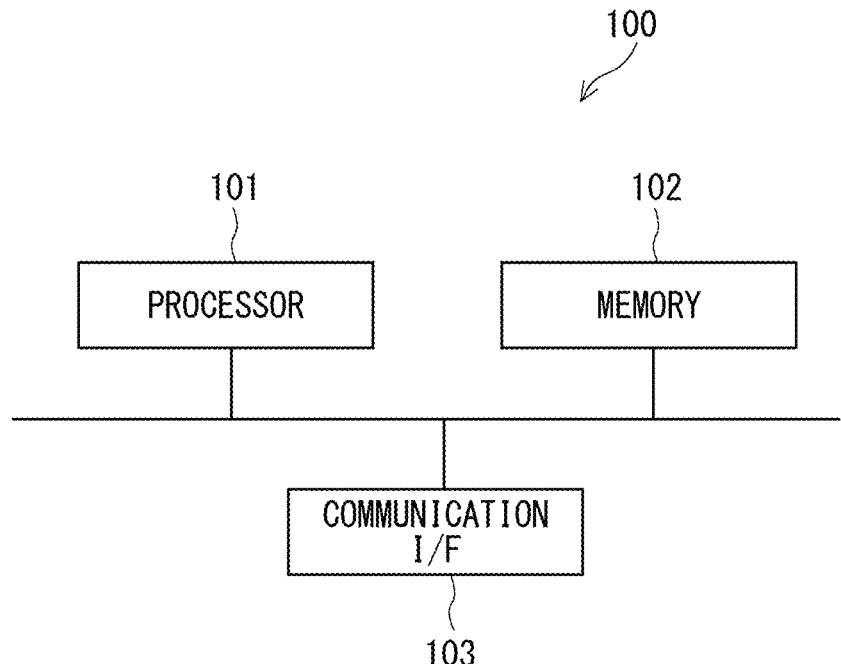
FIG. 11 is a diagram illustrating an example of a hardware configuration included in an apparatus.

In addition, each apparatus included in the incentive providing system described in the above embodiment can have the following hardware configuration. FIG. 11 is a diagram illustrating an example of a hardware configuration included in the apparatus.

An apparatus 100 illustrated in FIG. 11 is each apparatus in the incentive providing system according to the above embodiment, and includes a processor 101, a memory 102, and a communication interface (I/F) 103. The processor 101 may be, for example, a CPU, a graphics processing unit (GPU), a micro processor unit (MPU) which is also referred to as a microprocessor, or the like. The processor 101 may include a plurality of processors.

The function of each unit in each apparatus may be implemented by the processor 101 reading a program stored in the memory 102 and executing the program in cooperation with the communication I/F 103. Note that at least one of a wireless communication I/F or a wired communication I/F is provided in the communication I/F 103 in some apparatuses. In addition, each apparatus can include, for example, an I/F for a sensor, an input/output apparatus, or the like necessary for the apparatus.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

According to the present disclosure, it is possible to provide an incentive providing system, an incentive providing method, and a program capable of letting a user behave in such a way that his/her stress level is lowered and thus reducing his/her stress.

Note that the present disclosure is not limited to the above embodiment, and may be appropriately changed without departing from the gist. In addition, the present disclosure includes an appropriate combination of the examples in the above embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An incentive providing system, comprising:
a computer configured to execute:
  acquisition processing for acquiring a stress level indicating a degree of stress of a user; and
  provision processing for providing an incentive for the user in a case in which the stress level of the user is lower than a predetermined standard,
  wherein
  the provision processing comprises: in response to the stress level of the user being lower than the predetermined standard, controlling a traffic facility or a management system that manages the traffic facility, to change (i) at least one of a change in display in the traffic facility or a change in a shape of the traffic facility or (ii) at least one of a timing when it is changed or a duration of a changed state, as the incentive for the user to behave in such a way the stress level of the user is reduced, and in response to the stress level of the user being lower than the predetermined standard, controlling the traffic facility or the management system that manages the traffic facility to change the shape of the traffic facility to cause a separation line between a sidewalk and a roadway to physically appear, as the incentive for the user.

2. The incentive providing system according to claim 1, wherein the predetermined standard is a standard in accordance with an attribute of the user.

3. The incentive providing system according to claim 1, wherein the provision processing comprises processing for sending, to the traffic facility or the management system that manages the traffic facility, an instruction for controlling the traffic facility installed in at least one of a vicinity of a current position of the user for which the incentive is to be provided, a position on a route along which the user moves, or a position along the route, in such a way that the user for which the incentive is to be provided is able to preferentially move.

4. The incentive providing system according to claim 1, wherein
  the acquisition processing comprises processing for acquiring the stress level of the user who uses a mobile body, and
  the provision processing comprises processing for sending, to the traffic facility or the management system that manages the traffic facility, an instruction for controlling the traffic facility installed in at least one of a vicinity of a current position of the mobile body used by the user for which the incentive is to be provided, a position on a route along which the mobile body moves, or a position along the route, in such a way that the mobile body is able to preferentially move.

5. The incentive providing system according to claim 1, wherein
  the acquisition processing comprises processing for acquiring the stress level of the user who uses an autonomous mobile body that autonomously travels, and
  the provision processing comprises processing for sending, to an autonomous mobile body or a movement management system that manages a movement of the autonomous mobile body, an instruction for performing control in such a way that the autonomous mobile body used by the user for which the incentive is to be provided is able to preferentially move.

6. The incentive providing system according to claim 1, wherein the provision processing comprises processing for providing at least one of electronic money, virtual currency, or points that can be used in a product purchasing service for the user for which the incentive is to be provided.

7. The incentive providing system according to claim 1, wherein the provision processing comprises processing for sending, to a product management system that manages sending of a product, an instruction for sending the product to the user for which the incentive is to be provided.

8. The incentive providing system according to claim 1, wherein the computer is configured to further execute:
  identification processing for identifying the user; and
  inquiry processing for sending, to a terminal apparatus used by the user identified by the identification processing, an inquiry as to whether or not to perform processing for providing an incentive based on the stress level of the user.

9. The incentive providing system according to claim 1, wherein the acquisition processing comprises processing for acquiring the stress level of the user measured by a measurement instrument worn by the user.

10. The incentive providing system according to claim 1, wherein the acquisition processing comprises processing for acquiring vital information measured by a measurement instrument worn by the user and determining the stress level of the user based on the vital information.

11. The incentive providing system according to claim 1, wherein the computer is configured to further execute identification processing for identifying the user, and
  the acquisition processing comprises processing for acquiring vital information measured by a measurement instrument worn by the user and determining the stress level of the user from the vital information using a learning model trained by machine learning for the user identified in the identification processing.

12. The incentive providing system according to claim 1, wherein the acquisition processing comprises processing for acquiring imaging data obtained by imaging a face image of the user and determining the stress level of the user based on the imaging data.

13. The incentive providing system according to claim 1, wherein the computer is configured to further execute identification processing for identifying the user, and the acquisition processing comprises processing for acquiring imaging data obtained by imaging a face image of the user and determining the stress level of the user from the imaging data using a learning model trained by machine learning for the user identified in the identification processing.

14. An incentive providing method executed by a computer, the method comprising:

acquisition processing for acquiring a stress level indicating a degree of stress of a user, and provision processing for providing an incentive for the user in a case in which the stress level of the user is lower than a predetermined standard, wherein the provision processing comprises: in response to the stress level of the user being lower than the predetermined standard, controlling a traffic facility or a management system that manages the traffic facility, to change (i) at least one of a change in display in the traffic facility or a change in a shape of the traffic facility or (ii) at least one of a timing when it is changed or a duration of a changed state, as the incentive for the user to behave in such a way the stress level of the user is reduced, and in response to the stress level of the user being lower than the predetermined standard, controlling the traffic facility or the management system that manages the traffic facility to change the shape of the traffic facility to cause a separation line between a sidewalk and a roadway to physically appear, as the incentive for the user.

15. A non-transitory computer readable medium storing a program for causing, when executed by a computer, the computer to execute:

acquisition processing for acquiring a stress level indicating a degree of stress of a user; and provision processing for providing an incentive for the user in a case in which the stress level of the user is lower than a predetermined standard, wherein the provision processing comprises: in response to the stress level of the user being lower than the predetermined standard, controlling a traffic facility or a management system that manages the traffic facility, to change (i) at least one of a change in display in the traffic facility or a change in a shape of the traffic facility or (ii) at least one of a timing when it is changed or a duration of a changed state, as the incentive for the user to behave in such a way the stress level of the user is reduced, and in response to the stress level of the user being lower than the predetermined standard, controlling the traffic facility or the management system that manages the traffic facility to change the shape of the traffic facility to cause a separation line between a sidewalk and a roadway to physically appear, as the incentive for the user.

\* \* \* \* \*